US010348518B2

United States Patent
Lyotier et al.

(10) Patent No.: US 10,348,518 B2
(45) Date of Patent: Jul. 9, 2019

(54) METHOD, APPARATUS, SYSTEM AND MEDIA FOR TRANSMITTING MESSAGES BETWEEN NETWORKED DEVICES IN DATA COMMUNICATION WITH A LOCAL NETWORK ACCESS POINT

(71) Applicant: LEFT OF THE DOT MEDIA INC., Maple Ridge (CA)

(72) Inventors: John Gary Lyotier, Maple Ridge (CA); AKM Rakibul Islam, Khulna (BD); Christopher Mark Jensen, Pitt Meadows (CA)

(73) Assignee: LEFT TECHNOLOGIES INC., Maple Ridge, British Columbia (CA)

( * ) Notice: Subject to any disclaimer, the term of this patent is extended or adjusted under 35 U.S.C. 154(b) by 0 days.

(21) Appl. No.: 15/513,458

(22) PCT Filed: Sep. 22, 2015

(86) PCT No.: PCT/CA2015/000503
§ 371 (c)(1),
(2) Date: Mar. 22, 2017

(87) PCT Pub. No.: WO2016/044919
PCT Pub. Date: Mar. 31, 2016

(65) Prior Publication Data
US 2017/0331642 A1 Nov. 16, 2017

Related U.S. Application Data

(60) Provisional application No. 62/053,652, filed on Sep. 22, 2014.

(51) Int. Cl.
*H04L 12/54* (2013.01)
*H04W 4/12* (2009.01)
(Continued)

(52) U.S. Cl.
CPC ........ *H04L 12/5691* (2013.01); *H04L 51/046* (2013.01); *H04L 51/30* (2013.01);
(Continued)

(58) Field of Classification Search
CPC ..... H04W 84/12; H04W 12/06; H04W 36/14; H04W 12/08; H04W 88/08; H04W 52/34;
(Continued)

(56) References Cited

U.S. PATENT DOCUMENTS 8,208,386 B2 * 6/2012 Fowler ................ H04L 43/0811
370/248
2005/0243771 A1 * 11/2005 Hardy ................... H04L 51/066
370/331
(Continued)

FOREIGN PATENT DOCUMENTS

WO 2010111823 A1 10/2010

OTHER PUBLICATIONS

European Patent Office, Extended European Search Report, in connection with related European Patent Application No. 15843634. 5, dated Apr. 16, 2018, 7 pages.
(Continued)

Primary Examiner — Shaima Q Aminzay

(57) ABSTRACT

A method for transmitting messages between a first networked device and a second networked device via a local network provided by a local network access point is disclosed. The method involves on the first networked device, determining whether the second networked device meets local communications criteria by determining at least one of whether the second networked device is accessible via the local network at a local network address, and whether the second networked device has registered for communications via local networks. The method also involves, in response to a determination that the second networked device meets the
(Continued)

local communications criteria, transmitting the message via the local network access point to the local network address associated with the second networked device.

40 Claims, 14 Drawing Sheets

(51) Int. Cl.
*H04L 12/58* (2006.01)
*H04W 40/24* (2009.01)

(52) U.S. Cl.
CPC .......... *H04W 4/12* (2013.01); *H04W 40/246* (2013.01); *H04W 40/248* (2013.01)

(58) Field of Classification Search
CPC .................. H04W 80/045; H04W 84/105; H04W 88/12; H04W 8/20; H04L 12/4641; H04L 12/189; H04L 63/0876; H04L 12/2834; H04L 12/2856
USPC ............... 455/515, 566, 557, 552.1, 553.1; 370/338, 252, 352, 357, 428, 463, 493; 379/88.13, 93.09
See application file for complete search history.

(56) References Cited

U.S. PATENT DOCUMENTS

| | | | |
|---|---|---|---|
| 2008/0059627 A1* | 3/2008 | Hamalainen | H04L 51/043 709/224 |
| 2010/0124925 A1 | 5/2010 | Kim et al. | |
| 2012/0311329 A1 | 12/2012 | Medina et al. | |

OTHER PUBLICATIONS

Josh Thomas et al.: "Off Grid Communications with Android Meshing the Mobile World", Homeland Security (HST), 2012 IEEE Conference on Technologies for , IEE, Nov. 13, 2012, pp. 401-405, XP032330394.

International Search Report issued by the Canadian Intellectual Property Office in connection with International Patent Application No. PCT/CA2015/000503, dated Nov. 10, 2015, 4 pages.

Written Opinion of the International Searching Authority issued by the Canadian Intellectual Property Office in connection with International Patent Application No. PCT/CA2015/000503, dated Nov. 10, 2015, 6 pages.

* cited by examiner

900
{
902 — "my_name":"ofctab",
904 — "my_key":"ofctab_#_ac0dbbb6c11736881b48f6b437dce8a7ff78dcdb",
906 — "my_img":"\/9j\/4AAQSkZJRgABAQAAAQABAAD\/2wBDAAOJCgsKCAO....."
}

FIG. 9A

910
912 — "Hi"
914 — "ofctab_#_ac0dbbb6c11736881b48f6b437dce8a7ff78dcdb"
916 — "m_i"
918 — "Hey Joe, did you get the notes from Mr. Jenkins class?"

FIG. 9B

920
922 — "Hi"
924 — "ofctab_#_ac0dbbb6c11736881b48f6b437dce8a7ff78dcdb"
926 — "c_i", "i_i", "v_i", "a_i", or ".extension"

FIG. 9C

METHOD, APPARATUS, SYSTEM AND MEDIA FOR TRANSMITTING MESSAGES BETWEEN NETWORKED DEVICES IN DATA COMMUNICATION WITH A LOCAL NETWORK ACCESS POINT

BACKGROUND OF THE INVENTION

1. Field of Invention

This disclosure relates generally to communications and more particularly to communications between networked devices.

2. Description of Related Art

Communication via Smartphones and other networked devices has become very widespread and take place over wired or wireless networks. Wireless communications over telecommunication networks using 2G, 3G, 4G (LTE), and other communication protocols are usually associated with a limited bandwidth and/or limited data volume, above which costs to the user increase significantly. This phenomenon is particularly prevalent in developing counties where costs for accessing telecommunication networks are substantial, particularly in the context of local incomes. Additionally, many users have concerns related to the security of telecommunication networks, which have been shown to be susceptible to hacking and also are subjected to legal forms of interception.

SUMMARY OF THE INVENTION

In accordance with one disclosed aspect there is provided a method for transmitting messages between a first networked device and a second networked device via a local network provided by a local network access point. The method involves on the first networked device, determining whether the second networked device meets local communications criteria by determining at least one of whether the second networked device is accessible via the local network at a local network address, and whether the second networked device has registered for communications via local networks. The method also involves, in response to a determination that the second networked device meets the local communications criteria, transmitting the message via the local network access point to the local network address associated with the second networked device.

Determining whether the second networked device meets local communications criteria may involve determining that the second networked device is both accessible via the local network at a local network address and has registered for communications via local networks.

The message may include one of a text message, a Short Message Service (SMS) message, a Multimedia Messaging Service (MMS) message, a Voice-over-Internet Protocol (VoIP) message, a message including audio content, a message including a link to audio content, a message including a digital image, a message including a link to a digital image, a message including video images, and a message including a link to video images.

The local network access point may include at least one of a network switch, a network hub, a wireless router, a wired router, and a networked device operable to provide a tethered network connection for networking other devices.

Determining whether the second networked device is accessible via the local network may involve broadcasting a request message via the local network access point, the request message including network address information associated with the first networked device and being operable to illicit response messages from other networked devices in data communication with the local network access point, each response message may involve a networked device identification and a local network address for the networked device that transmitted the response message.

The networked device identification may include at least one of a telephone number associated with a networked device, a hardware identifier associated with the networked device, a user identifier associated with a user of the networked device, and a media access control (MAC) address of the networked device.

Broadcasting the request message may involve transmitting a User Datagram Protocol (UDP) request message to the local network access point, the UDP request message including address information operable to cause the local network access point to transmit the request message to all other networked devices in data communication with the local network access point.

The method may further involve, at the second networked device, receiving the request message from the first networked device, and transmitting a response message including the networked device identification and local network address for the second networked device.

Broadcasting the request message may involve broadcasting successive request messages.

The method may involve generating an entry in a contact listing stored on the first networked device in response to receiving a response message, the entry including at least the networked device identification and the local network address in the response message.

The entry in the contact listing may further include an accessibility indicator having a value identifying the contact as meeting local communications criteria.

The method may involve displaying on a display of the first networked device the contact listing, and the accessibility indicator associated with each entry.

Broadcasting the request message may involve broadcasting successive request messages and may further involve when a response message is not received within a timeout period from networked device having an entry stored in the contact listing on the first networked device, updating the accessibility indicator associated with the entry to have a value identifying the contact as no longer being accessible via the local network access point.

The method may involve generating the contact listing by transmitting a message to a registration server over a wide area network requesting contact details for the second networked device, the registration server being operable to provide contact details for networked devices that have registered for communications via local networks, and in response to receiving contact details from the registration server, generating an entry in the contact listing identifying the second networked device as having registered for communications via local networks, and further in response to receiving a message from the registration server indicating that contact details identifying the second networked device are not available, generating an entry in the contact listing identifying the second networked device as not having registered for communications via local networks.

Determining whether the second networked device has registered for communications via local networks may involve determining whether a contact listing stored on the first networked device includes an entry including an identifier indicating that the second networked device has registered for communications via local networks.

The first networked device may include stored records including contact information for people associated with a user of the first networked device and generating the contact listing may involve accessing the stored records, and for each stored record, determining whether a networked device associated with the contact has previously registered for communications via local network access point, where generating the entry in the contact listing may involve generating entries for response messages from registered networked devices and discarding response messages from non-registered networked devices.

Determining whether the second networked device meets local communications criteria may further involve determining whether the second networked device is trusted for communications.

Determining whether the second networked device is trusted for communications may involve determining whether a contact listing on the first networked device includes an entry having an identification that matches the networked device identification in the response message.

Determining whether the second networked device is trusted for communications may further involve determining whether the entry in the contact listing is associated with an assigned level of trust.

The method may further involve, in response to a determination that the contact listing is not trusted for communications, identifying the second networked device as an anonymous contact and where determining whether the second networked device meets local communications criteria may involve if the first networked device is configured to permit communication with anonymous contacts, determining that the second networked device meets local communications criteria, and if the first networked device is not configured to permit communication with anonymous contacts determining that the second networked device does not meet local communications criteria.

Transmitting the message via the local network access point may involve transmitting messages including data associated with a file transfer from the first networked device to the second networked device by transmitting a notification message to the second networked device, the notification message identifying a type of the message being transmitted, and in response to receiving an acknowledgement of the notification message initiating the transmission of one or more messages, each message including a portion of data associated with the file transfer.

Transmitting the notification message identifying the type of the message being transmitted may involve transmitting a message including an identification of a communication protocol for transmitting the message.

The local network access point may include one of a plurality of local network access points accessible to the first networked device for data communications and transmitting the notification message may involve transmitting a notification message including information identifying one of the plurality of local network access points and may further involve delaying initiating the transmission of the one or more messages until an acknowledgement is received from the second networked device indicating that the identified one of the plurality of local network access points is accessible to the second networked device.

The method may involve storing details of local network access points accessible to the first networked device and may further involve identifying one of the plurality of local network access points based on stored details.

The first and second networked devices each include a location receiver operable to provide a location of the networked device and identifying one of the plurality of local network access points may be based on a location of each of the networked devices.

At least one of the first networked device and local network access point may be connected to a wide area network, and the method may further involve, in response to a determination that the second networked device does not meet the local communications criteria, transmitting the message to the second networked device via the wide area network.

Transmitting the message to the second networked device via the wide area network may involve transmitting the message to a communications server accessible via the wide area network, the communications server having address information associated with networked devices that have registered for communications via the communications server, the communications server being operable to forward the message to the second networked device.

The wide area network may include at least one, of a data network provided by an internet services provider, a data network provided by a mobile telecommunications network provider, and a local area network.

The local network access point may be implemented as a mobile hotspot on the first networked device.

The first networked device may be operably configured for data communication via a wide area network while simultaneously communicating with other networked devices via the mobile hotspot.

The local network access point may include one of a plurality of local network access points accessible to the first networked device for data communications and determining whether the second networked device meets the local communications criteria may involve determining whether the second networked device meets the local communications criteria for communication via each local network access point in the plurality of network access points, and transmitting the message may involve transmitting the message via the one of the local network access points for which the second networked device meets the local communications criteria.

Transmitting the message may involve transmitting a message including connection information for facilitating connection of the second networked device to one of the local network access points accessible to the first networked device for data communications, and a local network access point selected by a user of the first networked device.

Transmitting the message via the local network access point may involve transmitting a notification message to the second networked device and other networked devices belonging to a group, the notification message including a multicast network address on the local network access point for facilitating multicast communications from the first networked device to the second networked device and the other networked devices belonging to the group.

At least one networked device of the group of networked devices may not be in communication with the local access point and the method may further involve transmitting the message via a wide area network to the at least one networked device not in communication with the local access point.

The method may further involve, receiving a reply message from the at least one networked device not in communication with the local access point via the wide area network and the method may further involve relaying the reply message to the multicast network address for receipt by other networked devices in communication with the local access point.

Transmitting the message to networked devices belonging to the group may involve transmitting multicast messages to a group including all of the networked devices in communication with the local access point.

The method may further involve, when the local access point is no longer accessible by the first networked device connecting to a wide area network, and in response to determining that one of the networked devices in the group is in communication with a wide area network and the local access point, transmitting the message to the networked device in the group that is in communication with a wide area network for retransmission to the group of networked devices via the local access point.

In accordance with another disclosed aspect there is provided a method for transmitting messages between a first networked device and a second networked device, the first networked device having a location profile including locations of local network access points that have been previously accessed by the first networked device. The method involves determining a current location of the first networked device, identifying a local access point in the location profile that is located proximate the current location, generating a message for transmission to the second networked device, and transmitting the generated message when the local access point is accessible by the first networked device.

Identifying the local access point in the location profile may involve identifying the local access point based on a current time of day and a time of day when the local access point was previously accessed by the first networked device.

Transmitting the message may involve transmitting a message including advertising content or a link to advertising content for display on the second networked device.

The method may involve downloading a communications application program for implementing local communications on the networked device, and downloading may involve receiving a data transfer from another networked device.

In accordance with another disclosed aspect there is provided a non-transient computer readable medium encoded with codes for directing a processor circuit to carry out any one of the methods above.

In accordance with another disclosed aspect there is provided a networked device for transmitting messages to a second networked device via a local network provided by a local network access point. The networked device includes a processor circuit operably configured to determine whether the second networked device meets local communications criteria by determining at least one of whether the second networked device is accessible via the local network at a local network address, and whether the second networked device has registered for communications via local networks. The processor circuit is also operably configured to, in response to a determination that the second networked device meets the local communications criteria, transmit the message via the local network access point to the local network address associated with the second networked device.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate disclosed embodiments,

FIG. 9 are examples of various message formats used by the processor circuit shown in FIG. 2;

DETAILED DESCRIPTION

Figure 1:
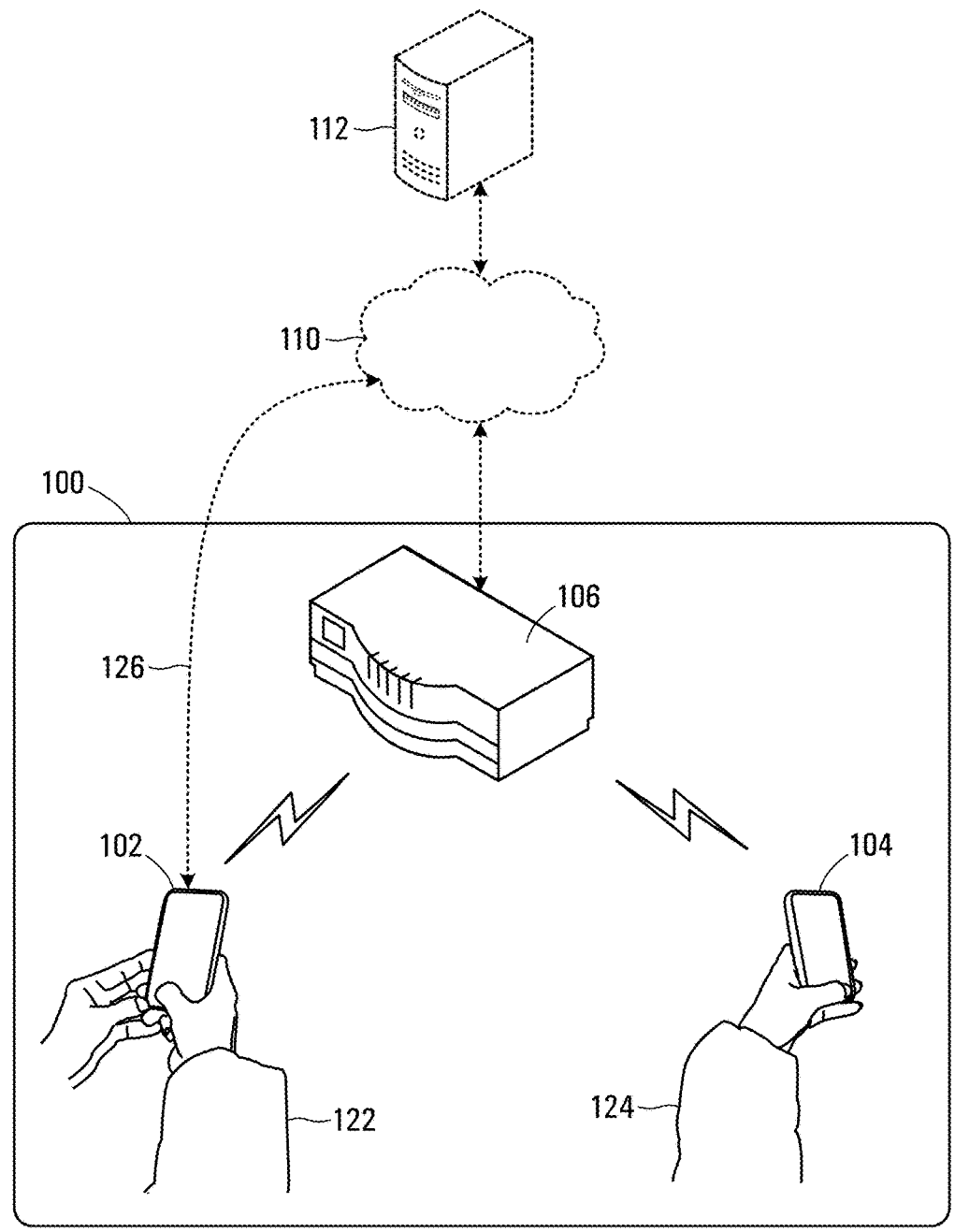
FIG. 1 is a schematic view of a communications system in accordance with one disclosed embodiment.

Communications System Referring to FIG. 1, a communications system according to a first disclosed embodiment is shown generally at 100. The communications system 100 includes a first networked device 102, a second networked device 104 and a local network access point 106. The local network access point 106 provides a local network for communications between the networked devices 102 and 104 and other networked devices. In the embodiment shown in FIG. 1, the first networked device 102 and second networked device 104 are in wireless data communication with the local network access point 106. The wireless data communications may be implemented based on any of the IEEE 802.11 wireless local area network (WLAN) protocols. In other embodiments data communication with the local network access point for any networked device may be via a wired connection, for example an Ethernet connection.

The local network access point 106 may be any computer networking device that provides for connection of both wireless and wired devices for networking. As an example, the local network access point 106 may be implemented using one or more computer networking devices such as a router, gateway, switch, hub, bridge, or repeater. The local network access point 106 provides functions for connecting networked devices in a local network, which may involve authenticating the networked devices and assigning each device a unique network address on the local network. The local network access point 106 keeps a record of network addresses assigned to devices that have authenticated and connected to the local network. In other embodiments the local network may be a public network that does not require any authentication. In some embodiments a networked device such as a Smartphone may have the capability to act as a mobile wireless hotspot, which permits other networked devices to wirelessly connect to the Smartphone. In such cases the networked device may be configured to provide local network access point functions.

The communications system 100 shown in FIG. 1 is also optionally in communication with a wide area network 110, such as the internet. While a connection to the wide area network 110 is not required for several of the communications embodiments described herein, such a connection if available may be used to provide additional functionality as described below. The local network access point 106 may include a port or device such as a modem for connecting to the wide area network. Additionally, in the embodiment shown the first networked device 102 is configured for direct access to the wide area network 110 using a mobile data connection 126 (for example a broadband RF data connection). The second networked device 104 either does not have the capability for accessing mobile data services or has not subscribed to such services. However, in this embodiment the second networked device 104 may access the wide area network 110 via the local network access point 106.

In this embodiment the wide area network 110 facilitates communication between the networked devices 102 and 104 and a registration server 112, described in greater detail later herein.

The networked devices 102 and 104 may be any type of computing device including a Smartphone, a tablet, laptop, or desktop computer, printer or other peripheral device, a game console, a smart appliance, or other device that is configured for network data communication. In FIG. 1, the first networked device 102 is shown as being operated by a first user 122 and the second networked device 104 by a second user 124.

Smartphone Networked Device

Figure 2:
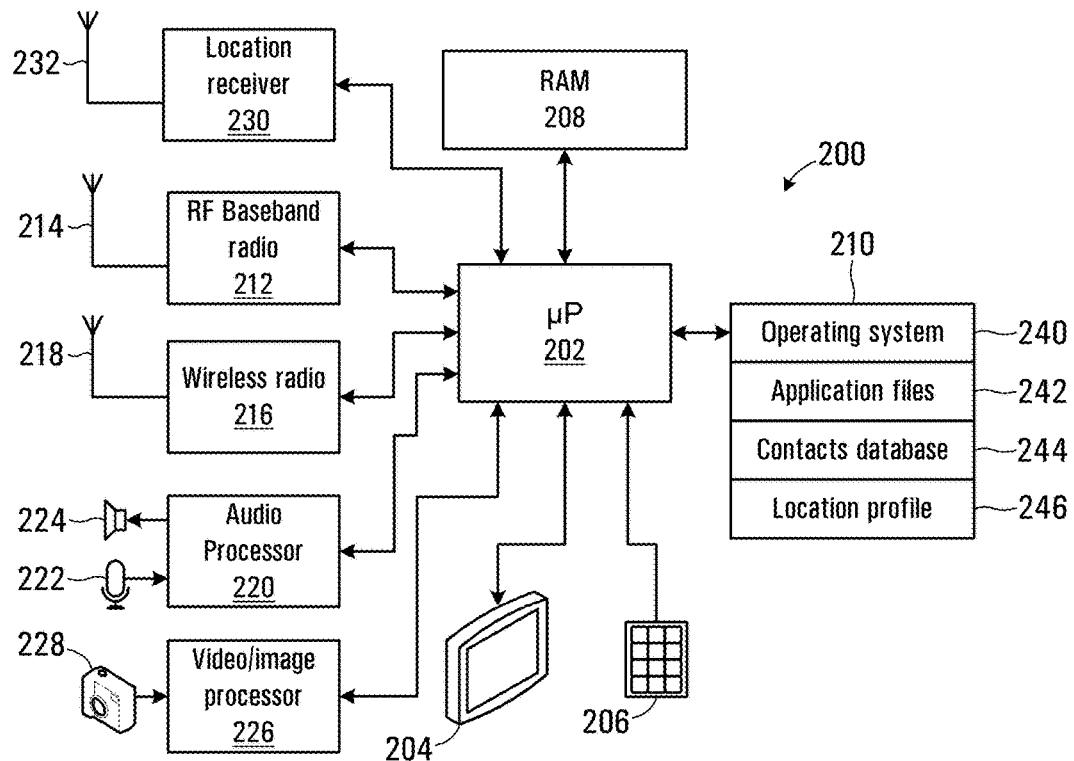
FIG. 2 is a block diagram of a processor circuit for implementing a networked device of the communications system shown in FIG. 1.

A block diagram of a processor circuit for a Smartphone networked device is shown in FIG. 2 at 200. Referring to FIG. 2, the processor circuit 200 includes a microprocessor 202, which may include multiple processing cores. The processor circuit 200 also includes a display 204 and an input device 206 for receiving user input.

In some embodiments the input device 206 may be provided as touch screen on the display 204. The processor circuit 200 also includes a random access memory 208 for storing data associated with applications that are running on the device. The processor circuit 200 also includes a non-volatile flash memory 210 for storing application files, image files, video files, audio files, and other data files. In the embodiment shown operating system files 240, application files 242, a contacts database 244, and a location profile 246, are stored in the non-volatile flash memory 210.

The processor circuit 200 further includes a RF baseband radio 212 and antenna 214 for connecting to a mobile telecommunications network. The RF baseband radio 212 may be configured to provide data communications using any of a variety of communications standards including 2G, 3G, 4G, or other communications standards. In the case of the first networked device 102 shown in FIG. 1, the RF baseband radio 212 provides for direct connection between the device and the wide area network 110. In the case of the second networked device 104, either the device is not equipped with a RF baseband radio, or the user 124 has not subscribed to mobile data communication services that would permit such a connection.

The processor circuit 200 also includes a wireless radio 216 and antenna 218 for connecting to a local network such as a WLAN local network provided by the local network access point 106 shown in FIG. 1. The wireless radio 216 may also provide for connections via other wireless protocols, such as Bluetooth or Near-field communication.

The processor circuit 200 further includes a location receiver 230. The location receiver 230 includes an antenna 232 for receiving global positioning system (GPS) signals and the location receiver 230 may use the GPS information in combination with other location information such as a known location of a particular local network access point or cellular signal triangulation information provided by a cellular service provider to determine a location of the networked device.

The processor circuit 200 further includes an audio processor 220, a microphone 222, and a speaker 224. The audio processor 220 receives and processes audio input signals from a microphone 222 and produces audio outputs at a speaker 224. The processor circuit 200 also includes a video/image processor 226 and a camera 228. The video/image processor 226 receives and processes image and/or video signals from the camera 228.

The display 204, input device 206, random access memory 208, non-volatile flash memory 210, RF baseband radio 212, wireless radio 216, audio processor 220, and video/image processor 226 are all in communication with the microprocessor 202.

The first networked device 102 and the second networked device 104 may each be implemented using the Smartphone processor circuit 200 shown in FIG. 2. Alternatively, one of the devices 102 and/or 104 may be implemented using a laptop computer, tablet computer, or other device. While the processor circuit 200 in FIG. 2 is shown for a Smartphone networked device, the processor circuit for other networked devices would be similarly configured, possibly differing only in the omission of the RF baseband radio 212 and the location receiver 230. While embodiments are described herein with reference to the Smartphone processor circuit 200 architecture in FIG. 2, the described system embodiments and/or process embodiment are also applicable to communications between other types of networked devices.

Wireless Router

Figure 3:
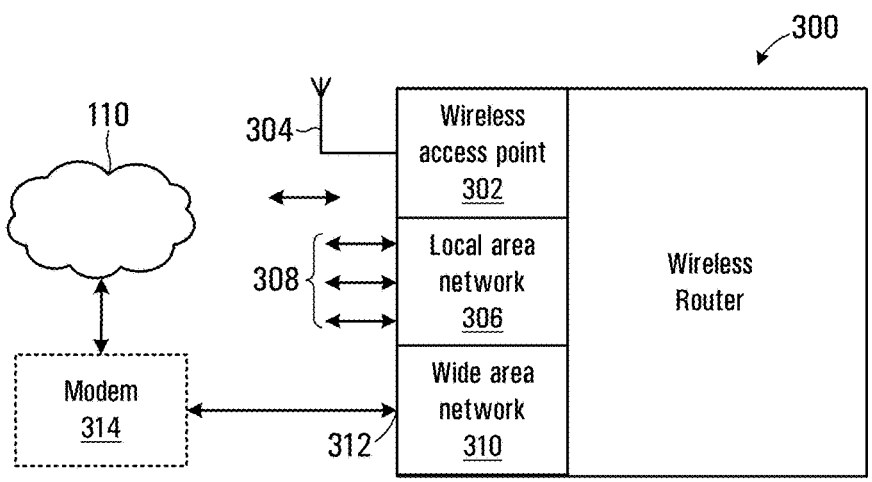
FIG. 3 is a block diagram of a router for implementing a network access point of the communications system shown in FIG. 1.

Referring to FIG. 3, in one embodiment the local network access point 106 may be implemented using a conventional wireless router 300. The wireless router 300 includes a wireless access point 302 and antenna 304 for wirelessly connecting networked devices 102 and 104. The wireless router 300 also includes a local area network access interface 306 for connecting a plurality of networked devices via wired connections 308. The wired connections 308 are generally implemented as Ethernet ports. The wireless router 300 also includes a wide area network interface 310 having a port 312 for connecting to the wide area network 110. The port 312 may be an Ethernet port. In some embodiments, a modem 314 may be required to communicate between the wide area network interface 310 and the wide area network 110. The modem may alternatively be included within the wide area network interface 310 of the wireless router 300, in which case the port 312 may be specific to the type of network access to the wide area network 110. For example, the port 312 may be a telephone port connection to a telecommunications network via ADSL or a cable connection for connecting to a cable internet service network.

Registration Server

Figures 4, 5:
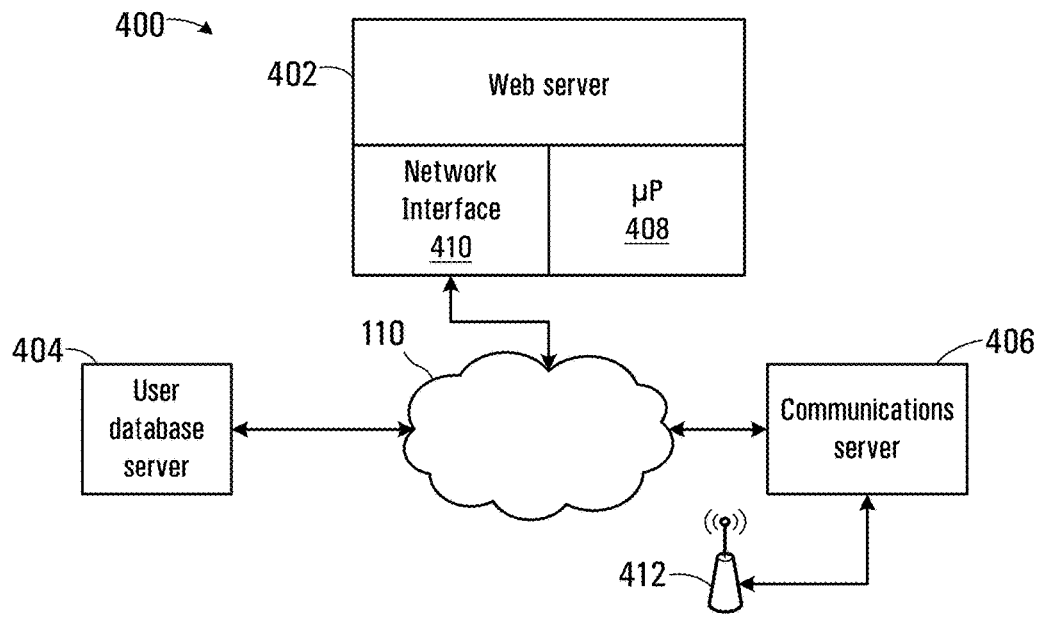
FIG. 4 is a block diagram of a registration server of the communications system shown in FIG. 1.
FIG. 5 is a flowchart representing blocks of codes for directing the processor circuit shown in FIG. 2 to transmit a message.

Referring to FIG. 4, in one embodiment the registration server 112 shown in FIG. 1 may include a be implemented using a web server 402, a user database server 404, and a communications server 406, as shown generally at 400. The web server 402 includes a microprocessor 408 and a telecommunications network interface 410 and may be implemented as Tornado Web Server, for example. The network interface 410 provides a connection to the wide area network 110 for communicating with the local network access point 106 or first networked device 102. The web server 402 has a network address that is accessible to local network access points (for example the local network access point 106) and to networked devices such as the device 102 that have direct access to the wide area network 110 using a mobile data connection. The network interface 410 also provides for communications between the user database server 404 and the web server 402 and between the communications server 406 and the web server.

In this embodiment the user database is implemented using a user database server 404, such as the Amazon DynamoDB™ managed database service. In other embodiments the user database may be implemented on the web server 402 or may be implemented using a database server that is in direct communications with the network interface 410.

The communications server 406 provides communication services for implementing various processes in accordance with embodiments described later herein. The communications server 406 may be in communication with a communications network 412 for transmitting text messages such as short message service messages (SMS), and/or providing voice and video call services. In one embodiment the communications server 406 is implemented using a server configured to run the RabbitMQ messaging server applications provided by Pivotal Software, Inc.

Overview of Messaging Process

Referring to FIG. 5, a flowchart depicting blocks of code for directing the processor circuit 200 to transmit a message from the first networked device 102 to the second networked device 104 is shown generally at 500. The blocks generally represent codes that may be read from the application files 242 stored in the flash memory 210 for directing the microprocessor 202 to perform various functions related to transmitting the message. The actual code to implement each block may be written in a suitable program language for application programming on the networked device, such as Objective-C, Java™, C#, C, C++ and/or assembly code.

The process 500 is implemented on the first networked device 102 and starts at block 602 when the first user 122 takes an action that initiates transmission of a message to the user 124 of the second networked device 104.

Block 504 then directs the microprocessor 202 to determine whether the second networked device 102 meets local communications criteria. In one embodiment this may involve determining whether the second networked device 104 is accessible via the local network at a local network address. In the embodiment shown in FIG. 1, the local network access point 106 provides the local network. A process for determining whether the second networked device 104 is accessible via the local network is described later herein. In some embodiments the criteria at block 504 may additionally include determining whether the second networked device 104 has registered for communications via local networks. In one embodiment the registration server 112 provides services for registering networked devices for communications via local networks. The registration process will be described in more detail later herein.

If the criteria for local communications at block 504 are satisfied, then block 506 directs the microprocessor 202 to cause the wireless radio 216 to transmit the message via the local network access point 106 to the second networked device 104. The message may include text, binary file data including executable files, audio data, image data, video image data, and/or links to such data, for example. A suitable protocol may be selected for transmitting the message based on the content. For example simple text messages and voice call audio data may be transmitted using the User Datagram Protocol (UDP) while binary file data, audio clip data, voice messages, and other data files may be transmitted using Transmission Control Protocol (TCP). Both UDP and TCP messages may be encapsulated in Internet Protocol (IP) messages, with include a destination network address and encapsulate the UDP, TCP or other message in an IP message payload. In the embodiment shown the destination address would be the network address of the second networked device 104 on the local network, and the local network access point 106 receiving the message would read the destination address and forward the message to the second networked device.

Advantageously transmission of the message via the local network access point 106 avoids mobile data charges that would be incurred by the first user 122 if the message were to be transmitted via the wide area network 110. Similarly, the user 124 of the second networked device 104 would be able to avoid mobile data charges in receiving or responding to the message via the local network access point 106.

In some embodiments, the transmitted message may include advertising content or a link to advertising content that will be displayed on the display 204 of the second networked device 104 when the content of the message from the first networked device 102 is received.

Figure 12:
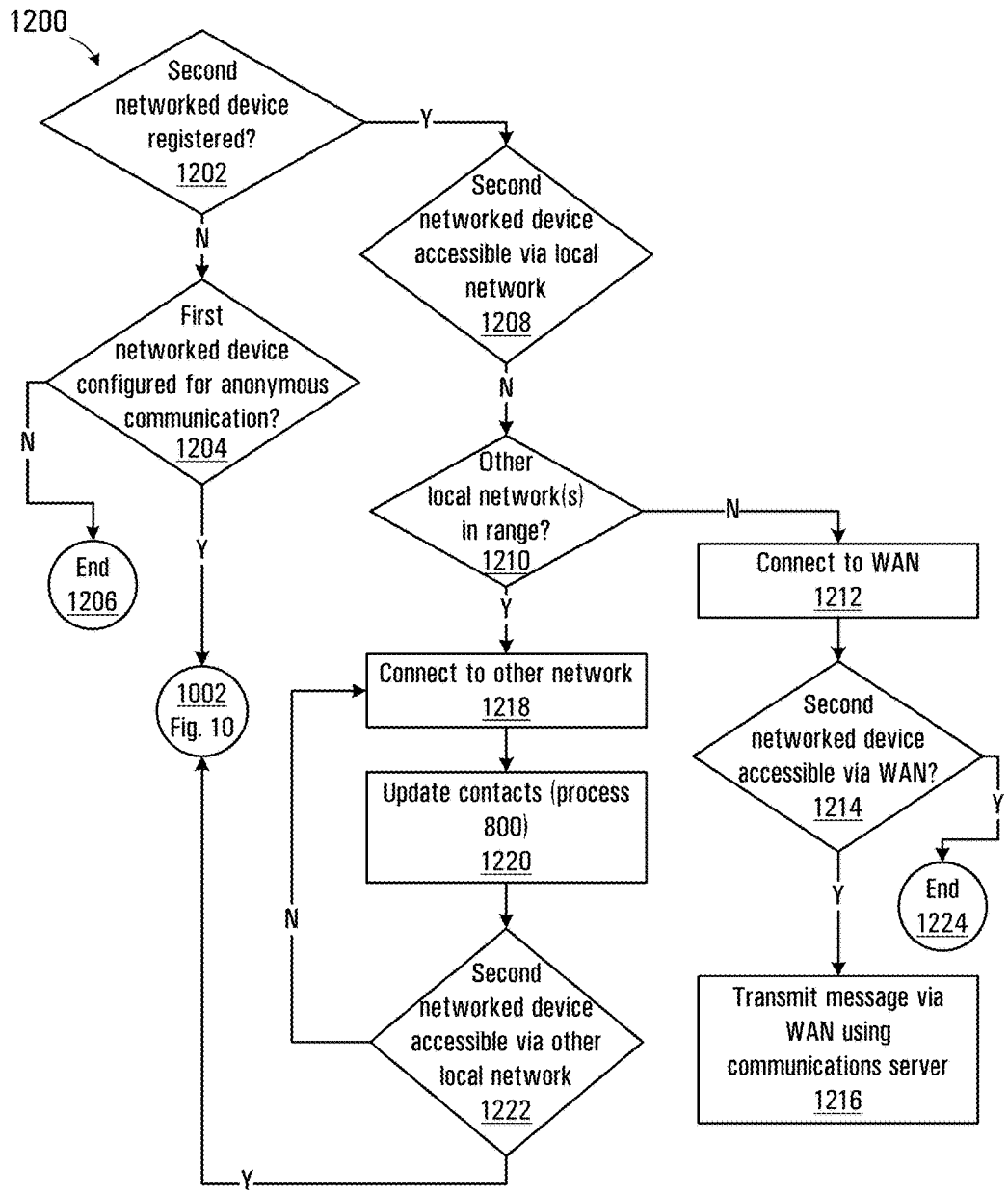
FIG. 12 is a flowchart representing blocks of codes for directing the processor circuit shown in FIG. 2 to transmit a message using alternative communication processing.

If at block 504 the local communications criteria are not met, then block 504 directs the microprocessor 202 to block 508 for alternative processing of the message. An alternative processing process 1200 is shown in FIG. 12 and is described later herein.

Registration Process

Figure 6:
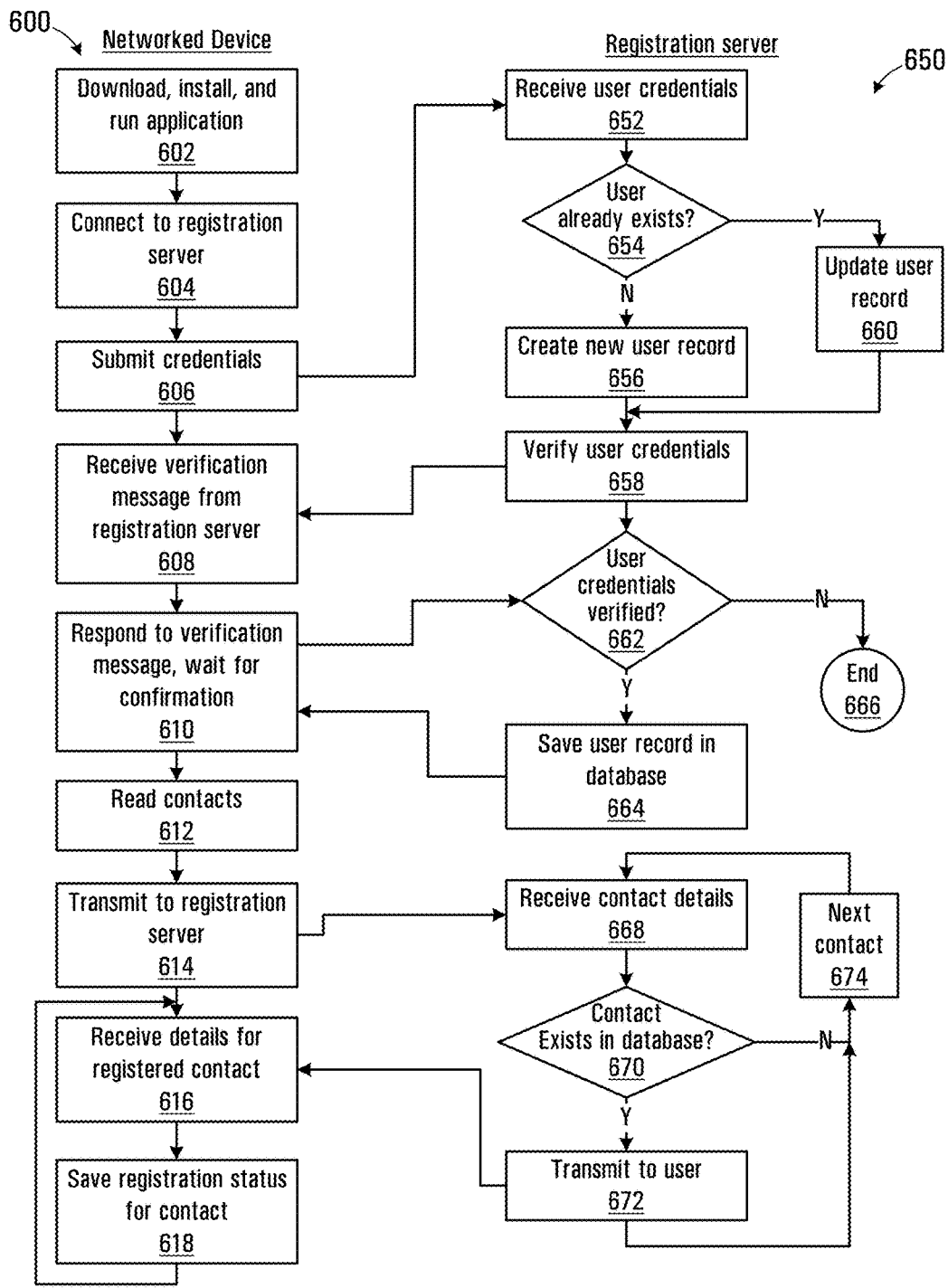
FIG. 6 is a is a flowchart representing blocks of codes for directing the processor circuits shown in FIG. 3 and FIG. 4 to implement a registration process.

Referring to FIG. 6, a flowchart depicting blocks of code for directing the processor circuit 200 of the networked device 102 or 104 to perform a registration process is shown at 600. A corresponding flowchart depicting blocks of code for directing the microprocessor 408 of the web server 402 to perform the registration process is shown at 650 in FIG. 6. Various screenshots of the display 204 of the networked device are shown in FIG. 7.

The registration process 600 begins at block 602, which directs the microprocessor 202 of the networked device to download and install a communications application program for implementing local communications on the networked device. In one embodiment, application program files are made available at a URL on the web server 402 or other server for downloading. Alternatively, the user may be directed to a repository of downloadable application files for the networked device. In yet another embodiment, the communication application program file may be provided by a user of another networked device in an email, file transfer, or other data transfer between networked devices. Block 602 directs the microprocessor 202 to download the application program file into either random access memory 208 or non-volatile flash memory 210 and to install the communication application on the networked device for providing local communications functionality. Once the application program is installed, the user may select a link provided for running the application and block 602 then directs the microprocessor 202 to run the installed communication application and the display 204 displays the screen 700 shown in FIG. 6A. The screen 700 includes a "get connected" selection area 702 displayed on the screen.

In response to the user selecting the "get connected" selection area 702, block 602 directs the microprocessor 202 to connect to the web server 402 of the registration server 400 shown in FIG. 4. In one embodiment, the communication application uses web browsing services provided by the operating system 240 to connect to the web server 402 and the application file includes a uniform resource locator (URL) that identifies a registration web page on the webserver.

Block 604 then directs the microprocessor 202 to submit credentials for the user (such as the first user 122 or second user 124). In one embodiment the credentials include a telephone number of the networked device being registered and a name and/or other user identifier associated with the user. The communication application may request user entry of the credentials by displaying a number of fields on the display 204 and receiving user entries via the input device 206. Referring of FIG. 7B and 7C, screenshot 704 includes a "Profile Name" field 706 and the screenshot 708 includes "Phone Number" field 710. In other embodiments, other information such as preferences, interests, age, sex, location information, and/or other demographic information may be requested by the web server 402 at the time of submitting credentials.

The server registration process 650 commences at block 552, which directs the microprocessor 408 of the web server 402 to receive the user credentials at the network interface 410. Block 654 then directs the microprocessor 408 to determine whether the user identified in the received credentials already exists by submitting a query based on the received telephone number to the user database server 404. If at block 654, a record of a user corresponding to the provided telephone number is not found by the user database server 404, the process continues at block 656. Block 656 directs the microprocessor 408 to cause a record including the provided user credentials to be generated. If at block 654, a record of a user corresponding to the provided telephone number is found and returned by the user database server 404, the process continues at block 660. Block 660 directs the microprocessor 408 to update any information in the record that differs from the database record. Block 656 and 660 thus produce a record including at least the user telephone number and optionally a user identifier.

The process then continues at block 658, which directs the microprocessor 408 to verify the user credentials. In one embodiment the verification involves transmitting a text message to the telephone number provided by. the user. Block 658 directs the microprocessor 408 to generate a text message including a verification code, which is then forwarded to the communications server 406 for transmission to the networked device via the communications network 412.

Figure 7A:
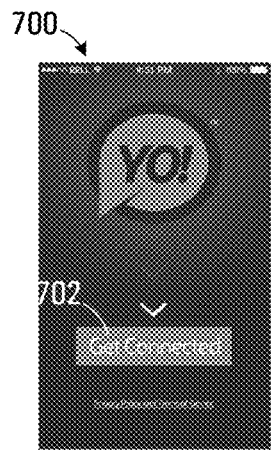
FIG. 7 is a series of screenshots of screen images displayed on a display of the processor circuit shown in FIG. 2.
Figure 7B:
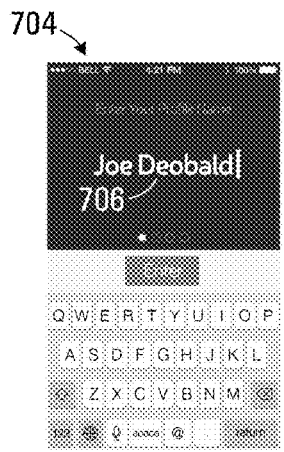
Figure 7C:
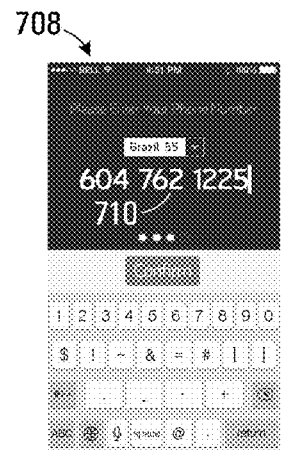
Figure 7D:
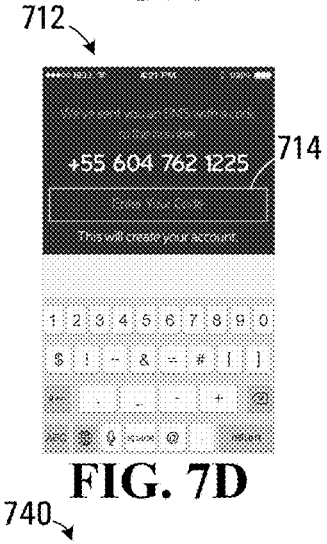

The process 600 then continues at block 608 when a verification message is received at the networked device from the registration server 400. Referring to FIG. 7D, in one embodiment the communication application displays the screenshot 712, informing the user that a SMS message including a verification code has been sent to the provided telephone number, and requesting entry of the code.

The user then enters the verification code in the field 714, and block 608 directs the microprocessor 202 to submit the verification code to the web server 402.

The process 650 then continues at block 662, which directs the microprocessor 408 of the web server 402 to verify that the code provided by the user of the networked device matches the code generated for the user, in which case the user credentials are considered to be verified and the process continues at block 662. Block 662 directs the microprocessor 408 to cause the user record to be saved in the user database on the user database server 404. If at block 662, response to the verification message is received or the code provided by the user of the networked device does not match the code generated for the user, then block 662 directs the microprocessor 408 to block 666 and the process ends. Alternatively at block 666 the user may be provided with a further opportunity to complete the registration process and the blocks 658 and 662 may be repeated.

Optionally block 664 may further direct the microprocessor 408 to send a confirmation of successful registration to the user via a further text message. If sent, block 608 directs the microprocessor 202 of the networked device 102 to await receipt of the registration confirmation message from the registration server 400, and the process then continues at block 610. The registration confirmation message may include a unique user identifier assigned to the networked device 102, such as a hash function of information the user telephone number as described above.

The process then continues at block 612, which directs the microprocessor 202 to read the contacts database 244 stored in the non-volatile flash memory 210 of the processor circuit 200. The contacts database 244 is generally implemented by the operating system 240 of the networked device and includes a plurality of contact entries names, telephone numbers, and other details for entities such as people, places, and organizations that have been saved by the user of the networked device. Block 614 then directs the microprocessor 202 to transmit the contact entries in the contacts database to the web server 402 of the registration server 400.

The process 650 then continues at block 668, which directs the microprocessor 408 to receive and read the contact entries. Block 670 then directs the microprocessor 408 to determine, for each contact entry, whether a record corresponding to a telephone number associated with the contact entry is stored in the user database on the user database server 404. If at block 670 the telephone number is found on the user database server 404, then the contact entry corresponds to an entity that has previously registered for local communications and the process continues at block 672. Block 672 directs the microprocessor 408 to transmit information to the networked device identifying the contact entry has been associated with a registered user. The transmitted information may include a user identifier for the contact entry that has been assigned by the registration server 400. In one embodiment the user identifier may have been generated using a hash function from information previously provided by the user, such as a user name and/or telephone number to provide a unique identifier for the user. Block 672 then directs the microprocessor 408 to block 674, which directs the microprocessor 408 to continue with processing of the next contact entry.

If at block 670, the telephone number is not found on the user database server 404 the contact entry is considered to not be a registered user and block 674 directs the microprocessor 408 to continue with processing of the next contact entry. The blocks 668-674 are repeated until all of the contact entries have been processed.

Figure 7E:
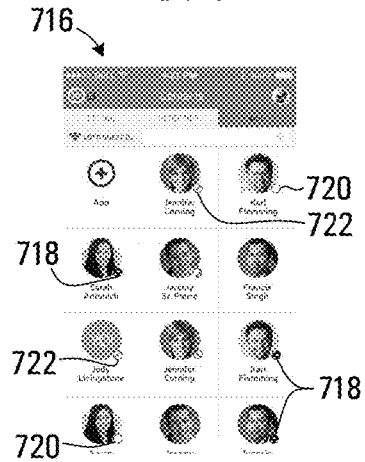

The process 600 continues at block 616 when the information identifying the contact entry as being associated with a registered user is received from the web server 402 of the registration server 400. Block 618 then directs the microprocessor 202 to save a registration status for the contact indicating that the contact is registered for local communications with the registration server 400. In one embodiment, the contact database 244 may include a status field that has been defined for indicating contact entries to be registered users. Referring to FIG. 7E, a screenshot of a contact display screen is shown at 716. Contacts that have a value in the status field indicating that they have registered with the registration server 400 for local communications are displayed along with an accessibility indication 718, indicating their registration status. In the embodiment shown the indicator 718 changes shading or colour to indicate the registration status.

Discovery Process

Figure 8:
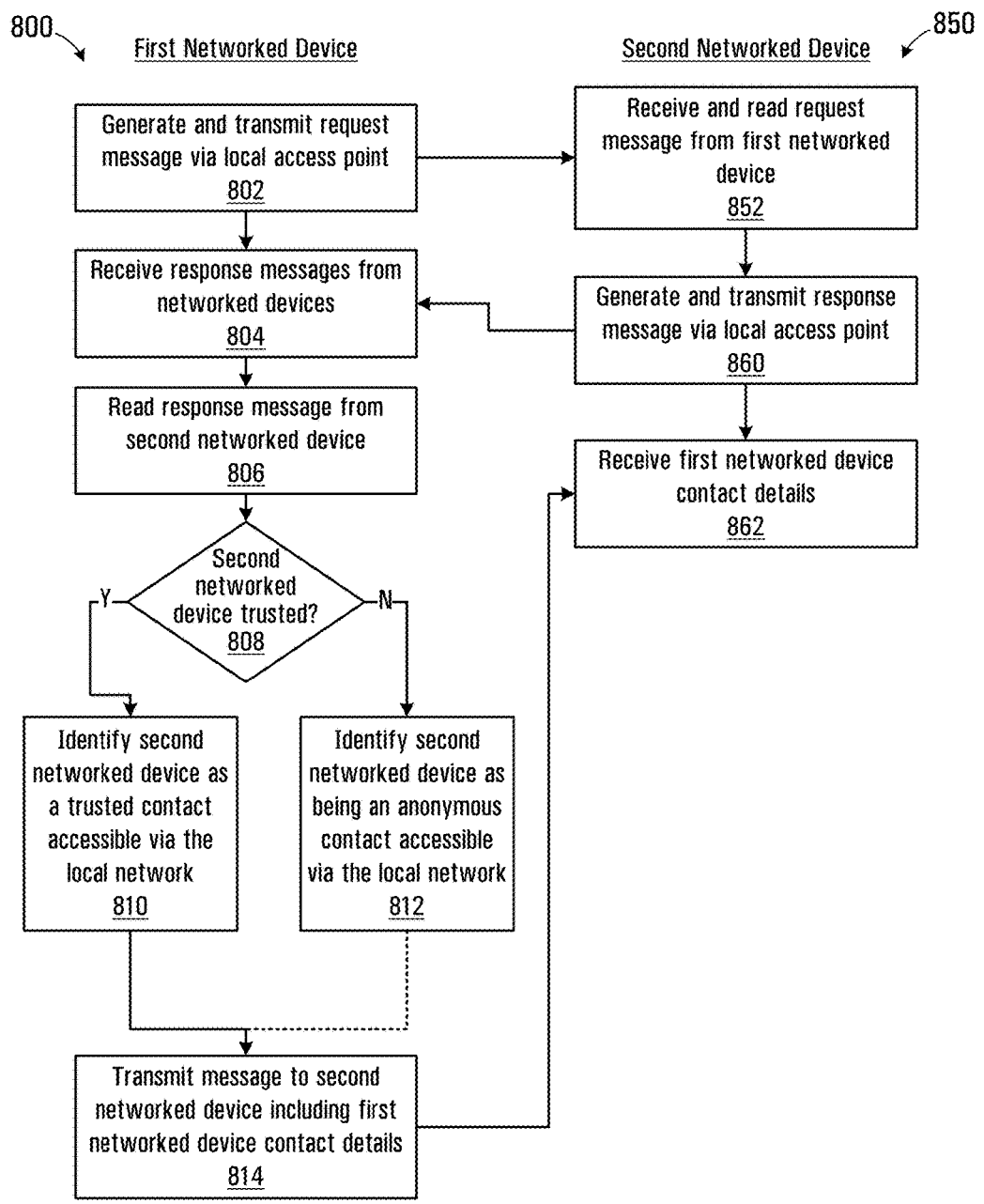
FIG. 8 is a flowchart representing blocks of codes for directing the processor circuit shown in FIG. 2 to perform a discovery process.

Referring to FIG. 8, a flowchart depicting blocks of code for directing a processor circuit of the first networked device 102 to perform a discovery process for determining networked devices that are accessible via a local network is shown at 800. A corresponding flowchart depicting blocks of code for directing a processor circuit of the second networked device 104 to respond to the request message is shown at 850 in FIG. 8. The first and second networked devices 102 and 104 may each be implemented using the processor circuit 200 shown in FIG. 2.

The discovery process 800 begins at block 802, which directs the microprocessor 202 of the first networked device 102 to generate and transmit a request message, which is operable to illicit response messages from other networked devices in data communication with the local network access point. In one embodiment the request message is formatted using the UDP multicast message protocol and includes a request string in the data payload such as "are_you_a_yo_user?yes_i_am". In one embodiment the microprocessor 202 of first networked device 102 creates a network socket for the transmission, which is bound to a port number such as port 2521. The UDP message is encapsulated in an Internet Protocol (IP) packet, which includes the IP address of the first networked device 102, along with a destination address that specifies a range of IP addresses on the local network. The local network access point 106 receives the IP message encapsulating the UDP request message and forwards the message to all IP addresses in the destination address range. The UDP message includes the port number, 2521 and the multicast message will be received by all networked devices that fall within the destination address range and are listening for UDP messages on port 2521. Advantageously, UDP messages are relatively short and thus have a low transmission overhead, which permits the message to be repeatedly multicast.

The discovery process 850 begins at block 852, when the second networked device 104 receives the UDP request message from the first networked device 102. If the second networked device 104 is running the communication application, the microprocessor 202 would be listening on the port 2521 for UDP messages. For networked devices that are not running the communication application, the UDP message may be discarded or ignored. Block 854 then directs the microprocessor 202 of the second networked device 104 to generate and transmit a response message including a user identifier of the second networked device 104. In one embodiment the response message is encoded in JavaScript Object Notation (JSON) format, which provides a convenient structure for parsing data fields while having a lower transmission overhead than XML. An example of a JSON response message is shown in FIG. 9A at 900. In the embodiment shown the response message 900 includes a name 902 of the second user 124, a user identifier 904 previously provided by the registration server 400 (i.e. at blocks 664 and 610 of the process 600), and optionally an image encoded string 906 including an image associated with the user. In this embodiment, the JSON response message 900 is encapsulated in a UDP response message, which is transmitted as an IP packet via the local network access point 106 to the first networked device 102. The IP packet includes the IP address of the second networked device 104 on the local network and the UDP message includes the destination port number.

The process 800 then continues at block 804 when the response message is received at the first networked device 102. Block 806 then directs the microprocessor to read the response message and to parse the data fields to extract the user name, user identifier, and image. Block 806 also directs the microprocessor 202 to extract the IP address of the second networked device 104 from the IP packet in which the message is encapsulated. Block 808 then directs the microprocessor 202 of the first networked device 102 to determine whether the second networked device is a trusted device. In one embodiment, this involves comparing the user identifier provided by the second networked device 104 in the response message with user identifiers associated with contacts stored in the contacts database 244 to determine whether there is a matching contact. In other embodiments, the user 122 of the first networked device 102 may assign a level of trust or other grouping information to each contact in the contacts database 244, as described later herein. If at block 810, the second networked device 104 is identified as a trusted device, then the contact is identified as being a trusted contact that is accessible via the local network. Referring to FIG. 7E, the trusted and accessible status of the contact may be indicated by the accessibility indication 720, which has a different shading or colour appearance than the accessibility indication 718.

If at block 810 of the process 800 the second networked device 104 is not identified as a trusted device, then block 812 directs the microprocessor 202 to identify the device as being an anonymous contact that is accessible via the local network. An anonymous contact may be associated with a networked device that has not completed the registration process 600 shown in FIG. 6. Alternatively, a networked device may have completed the registration process 600, but may not have been included in contacts database 244 of the first networked device 102 and may thus be regarded as an anonymous or 'un-trusted' contact. In one embodiment a user of a networked device may download or obtain the communication application files 242 from a user of another networked device in an email, file transfer, or other data transfer between networked devices. The networked device may not have access to the wide area network 110 for completing the registration process 600 and once installed the communication application may self-assign a user identifier and would provide local communication services with other networked devices that have been configured to communicate with anonymous contacts. At a later time when the communications application determines that the anonymous networked device is connected to the wide area network 110, the user may be prompted to complete the registration process and the self-assigned user identifier may be either stored in the user database server 404 along with the anonymous users credentials or a new user identifier may be assigned. Referring to FIG. 7E, the anonymous but accessible status of the contact may then be indicated by the accessibility indication 722. If the first networked device 102 is configured to permit communication with anonymous networked devices, then block 812 directs the microprocessor 202 to block 814.

Block 814 then directs the microprocessor 202 of the first networked device 102 to transmit a message to the second networked device 104 including contact details for the first networked device 102. The message may be similar to the message 900 shown in FIG. 9A, providing the user name of the first user 122, user identifier, and image. The message is transmitted within an IP packet to the IP address read from the response message at block 806.

The process 850 then continues at block 862, which directs the microprocessor 202 of the second networked device 104 to receive and process the contact details of the first networked device 102. The processing may be similar or identical to the processing on the 102, i.e. blocks 806-812.

The first networked device 102 may receive a plurality of response messages from different networked devices in data communication with the local network access point 106, and blocks 806-810 may be repeated for each response message that is received at block 804. In one embodiment the process 800 may be executed on a periodic basis. For example, the process may be executed at fixed time intervals or may be executed when the user first user 122 wishes to send a message. By minimizing the transmission overhead associated with the request and response messages, an updated status may be maintained for contacts in the contacts database 244 that indicates whether or not they are accessible via the local network provided by the local network access point 106. If the status of a particular contact changes, for example when the networked device of the contact is moved out of range of the local network access point 106, then the status of the contact is updated and the accessibility indication 718, 720, or 722 on the screen 716 is changed accordingly.

Local Message Transmission Process

Figure 10:
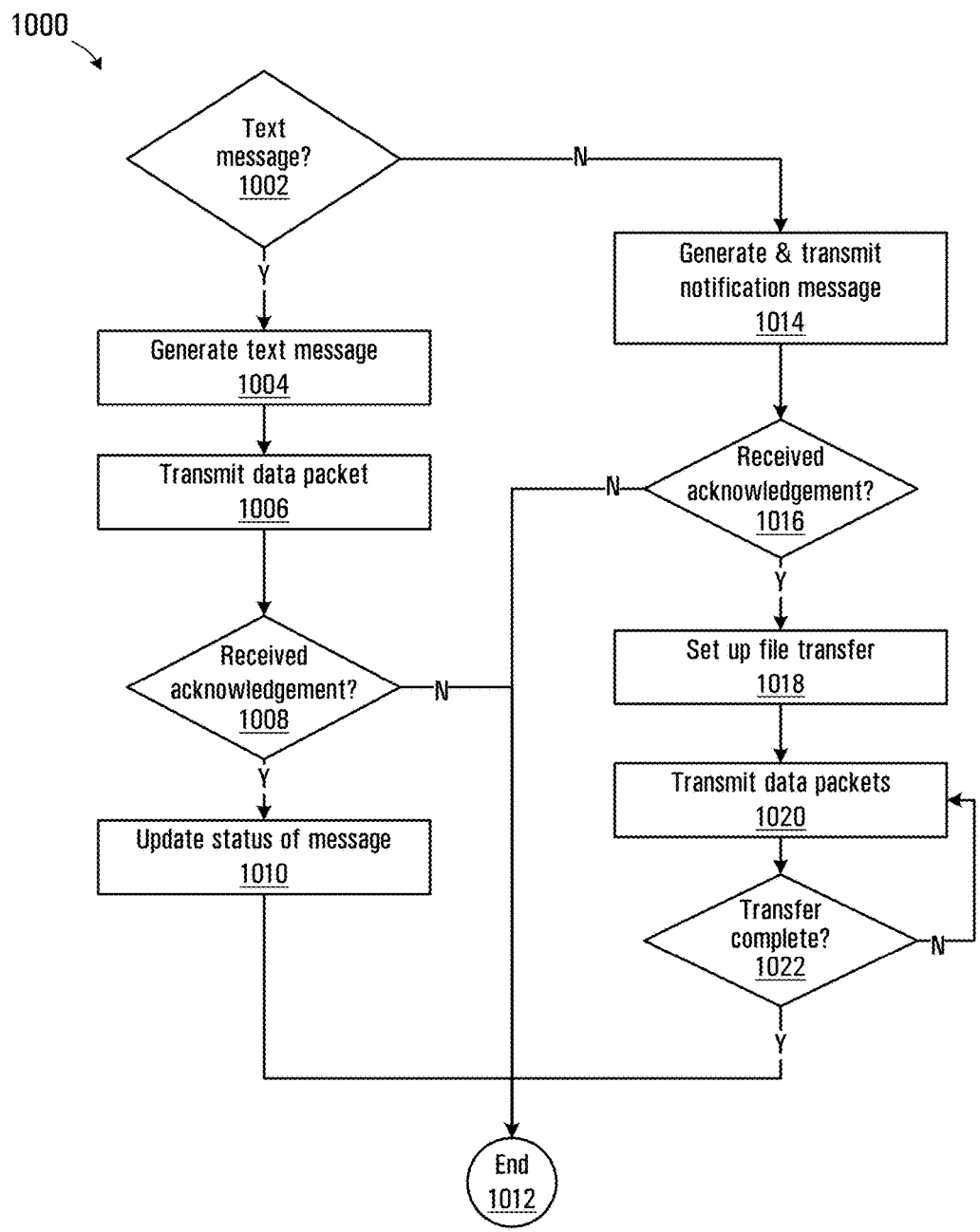
FIG. 10 is a flowchart representing blocks of codes for directing the processor circuit shown in FIG. 2 to transmit a message in accordance with another disclosed embodiment.

Referring to FIG. 10, a flowchart depicting blocks of code for directing the processor circuit 200 of the first networked device 102 to implement block 506 of the process 500 (shown in FIG. 5) is shown at 1000. At block 506 of the process 500, the first user 122 of the first networked device 102 has initiated transmission of a message to the second networked device 104, and the second networked device has already been determined to be registered for local communications and accessible via the local network.

The message transmission process 1000 begins at block 1002, which directs the microprocessor 202 of the first networked device 102 to determine whether the first user 122 wishes to send a text message. When the first networked device 102 is selected for transmission of a message at block 502 of the process 500, the communications application may present several options for types of messages to be transmitted.

Figure 7F:

Referring to FIG. 7F, a screenshot of a text messaging screen is shown at 730, which is displayed when the first user 122 elects to send a text message to the second networked device 104. The screenshot 730 includes a text entry box 732 and a touch screen keyboard 734 for entering text. If at block 1002, the user 122 of the first networked device 102 indicates that a text message is to be sent, then the process continues at block 1004.

Block 1004 then directs the microprocessor 202 of the first networked device 102 to generate a text message using the text entered by the first user 122 in the text entry box 732. Referring to FIG. 9B, an example of a message body of a text message is shown at 910. The text message 910 includes a message header 912, a user identifier 914 of the first networked device 102, and a message type 916. In this case the message type "m_i" is associated with text messages. The text message further includes a text message body 918, including the text entered by the first user 122. Block 1004 also directs the microprocessor 202 to encapsulate the text message 910 in a suitable data packet for transmission and to include the appropriate IP address for the second networked device 104 and the port number. In one embodiment text messages may be transmitted using the UDP protocol over IP, which includes fields for destination IP address and the destination port.

Block 1006 then directs the microprocessor 202 to transmit the data packet via the local network access point 106, which receives the IP message, reads the header to determine the destination IP address on the local network, and forwards the message to the second networked device 104. Block 1006 also directs the microprocessor 202 to associate a "transmitted" status with the message to indicate that the message has been successfully transmitted. If the second networked device 104 is still accessible on the local network, the communications application running on the device would be listening on port 2521 and would receive and display the text message on a screen similar to the screen 730. In this embodiment, the second networked device 104 reads the source IP address (i.e. the IP address of the first networked device 102) in the IP message and generates and transmits an acknowledgement message back to the first networked device. The acknowledgement message may be a UDP over IP message having a message body "ack", for example.

The process 1000 then continues at block 1008, which directs the microprocessor 202 of the first networked device 102 to mark the text message as having been received in which case the process continues at block 1010. Block 1010 directs the microprocessor 202 to update the status of the message as having been received. Referring back to FIG. 7F, in one embodiment the received status of the message may be indicated by the message display 736 on the screenshot 730. For example, successfully transmitted message may be shown in a different color or the message 736 may only be displayed once successfully transmitted. The process 1000 then ends at 1012. If at block 1008, no acknowledgment is received then the status of the message is not updated and the process ends at 1012.

Figure 7G:
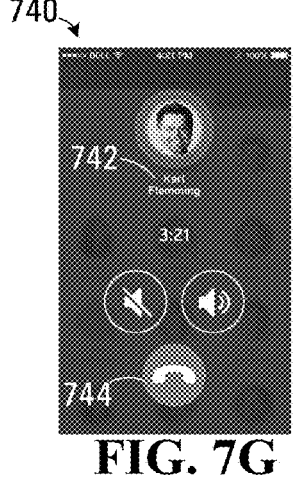
Figure 11:
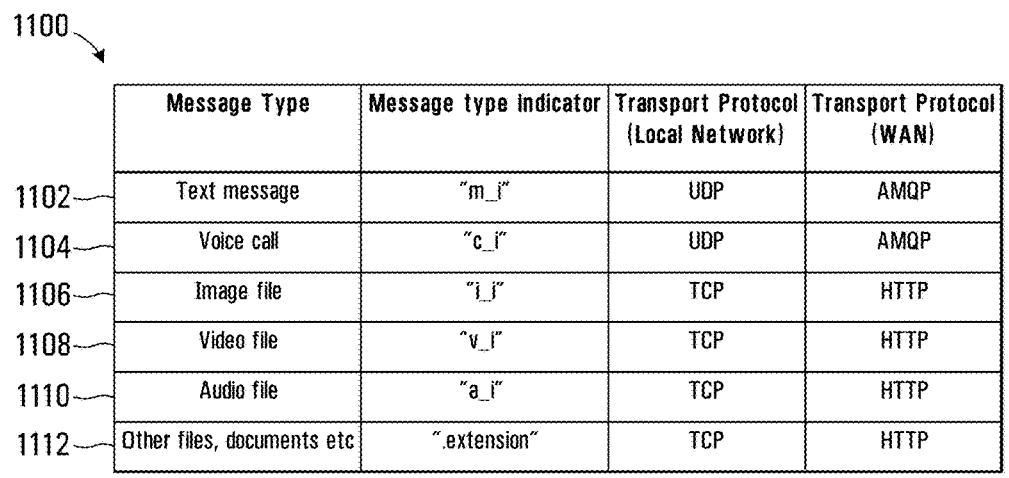
FIG. 11 is a table of message types that may be transmitted by the processor circuit shown in FIG. 2.

If at block 1002, the user 122 of the first networked device 102 indicates that a message other than a text message is to be sent, then the process continues at block 1014. Block 1014 directs the microprocessor 202 of the first networked device 102 to generate a notification message including details of the message type to be transmitted. Referring to FIG. 7G, a screenshot of a screen for initiating a voice call between the first networked device 102 and another user of a networked device that is accessible over the local network is shown at 740. The contact details of the other user are shown at 742 and generation of the notification message is initiated when the first user 122 of the first networked device 102 touches a call button 744 on the screen. Referring to FIG. 9C, an example of a notification message is shown at 920, and includes a message header 922, a user identifier 924, and a message type 926. In this embodiment, the notification message may be transmitted using the UDP protocol but unlike the text message 910 does not include a message body. Referring to FIG. 11, a table listing examples of a number of different message types is shown at 1100. The message types 1100 may include text messages 1102 as described above, voice call messages 1104 associated with a voice call between the first networked device 102 and second networked device 104, image file messages 1106 for transferring image files between networked devices, video file messages 1108 for transferring video clips between networked devices, and audio file messages 1110 for transferring audio file formats such as MP3 files between networked devices. The messages 1102-1112 each include a message type indicator, and may be transmitted over the local network using the transport protocols listed in the message types 1100. The transport protocol over WAN will be described later herein. Other files and documents may also be transferred using the commonly used file extension as a message identifier. For example, the communications application files may have an extension that identifies these as program filed (for example an ".apk" extension under the Google Android™ operating system) and may also be transferred from the first networked device 102 to other networked devices, as described above. Block 1014 also directs the microprocessor 202 of the first networked device 102 to transmit the notification message via the local network access point 106 to the second networked device 104 and to associate a "transmitted" status with the notification message. Block 1016 then directs the microprocessor 202 to wait for an acknowledgement to be received from the second networked device 104. The acknowledgement message, when received indicates that the second networked device 104 is ready to receive the file transfer and block 1016 directs the microprocessor 202 to block 1018.

Block 1018 then directs the microprocessor 202 to set up the file transfer. The file transfer protocol depends on the message type, and in the example shown in FIG. 11 the UDP protocol may be used for voice calls. The TCP protocol may be used for other file transfers, by creating a TCP connection between the first networked device 102 and the second networked device 104. Voice calls generally require that voice data be streamed with a low transmission overhead, which may be provided by the UDP protocol. The odd dropped data packet, which may result from the use of the UDP protocol would lower the call quality, but would not be as problematic as a missing portion of a file, such as an image file, for example. Transmission of voice call data over UDP is provided by transmitting a plurality of UDP packets including voice data portions. The packets are serialized to prevent interruption of the voice call.

Block 1020 then directs the microprocessor 202 to begin transmission of data packets in accordance with the selected protocol. Both UDP and TCP protocol messages may be encapsulated in IP protocol messages. Block 1022 then directs the microprocessor 202 of the first networked device 102 to determine whether the file transfer or voice call has completed. If at block 1022, the file transfer or voice call has not yet completed, the microprocessor 202 is directed back to block 1020 and blocks 1020 and 1022 are repeated. If at block 1022 the transfer has completed, then the process 1000 ends at 1012.

Alternative Communication Processing

Referring to FIG. 12, a flowchart depicting blocks of code for directing the processor circuit 200 of the first networked device 102 to implement the alternative processing shown in the process 500 of FIG. 5 is shown at 1200. The alternative processing process 1200 begins at block 1202, which directs the microprocessor 202 of the first networked device 102 to determine whether the second networked device 104 is registered for local communications. If at block 1202 the second networked device 104 is not registered for local communications, the microprocessor 202 is directed to block 1204, which directs the microprocessor to determine whether the first networked device 102 is configured for anonymous communication. In one embodiment the communications application may include an option that the user 122 can select to enable or disable anonymous communications. If at block 1204, anonymous communications are disabled the process 1200 ends at block 1206 and the message is not transmitted. If at block 1204, anonymous communications are permitted then block 1204 directs the microprocessor 202 of the first networked device 102 to block 1002 and the transmission proceeds in accordance with the message transmission process 1000.

If at block 1202, the second networked device 104 is registered for local communications, the microprocessor 202 is directed to block 1208, which directs the microprocessor to determine whether the first networked device 102 is accessible via the local network local network access point 106 shown in FIG. 1. If at block 1208, the second networked device 104 is not accessible, then the microprocessor 202 is directed to block 1210.

Figure 13:
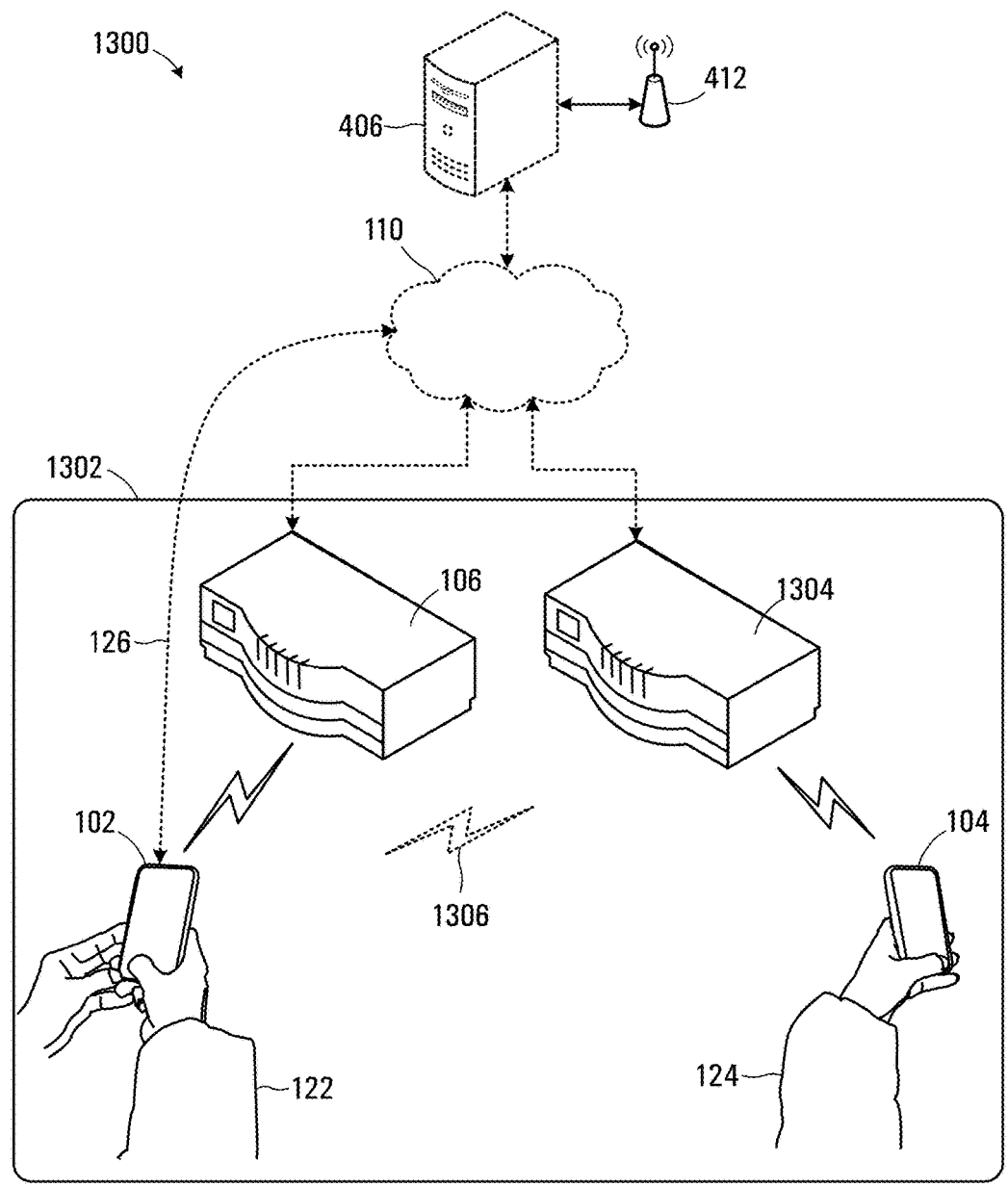
FIG. 13 is a schematic view of an alternative communications system in accordance with another disclosed embodiment.

Block 1210 directs the microprocessor 202 of the first networked device 102 to determine whether there are any other local networks in range of the networked devices 102 and 104. An alternative embodiment of the communications system shown in FIG. 1 is shown at 1300 in FIG. 13. The communications system 1300 includes a local communications system 1302. The local communications system 1302 includes the local network access point 106 (the first local network access point) and further includes a second local network access point 1304. The access points 106 and 1304 are both connected to the wide area network 110. The communications system 1300 also includes the communications server 406 in communication with the communications network 412 shown in FIG. 4. In the embodiment shown, the second networked device 104 is in data communication with the second local network access point 1304 while the first networked device 102 is in data communication with the first local network access point 106. The second local network access point 1304 is within range of the first networked device 102 (indicated by the wireless connection indicator 1306 shown in broken outline). However the first networked device 102 is initially not in data communications with the second local network access point 1304. Block 1210 thus directs the microprocessor 202 to block 1218. Block 1218 then directs the microprocessor 202 of the first networked device 102 to connect to the second local network access point 1304.

The process 1200 then continues at block 1220, which directs the microprocessor 202 to execute the process 800 shown in FIG. 8 for determining networked devices that are accessible via the second local network access point 1304. Block 1222 then directs the microprocessor 202 to determine whether the second networked device 104 is accessible via the second local network access point 1304.

If at block 1222 the second networked device 104 is not accessible via the second local network access point 1304, block 1222 directs the microprocessor 202 back to block 1218 for connection to any other networks that may be in range of the first networked device 102.

If at block 1222 the second networked device 104 is accessible then block 1222 directs the microprocessor 202 to block 1002 of FIG. 10 and the transmission of the message via the second local network access point 1304 proceeds in accordance with the process 1000.

In other embodiments, where there are two or more local networks in range to each of the first and second networked devices 102 and 104, and a messaging communication is ongoing between the devices, one of the devices may determine that a connection signal with either the first or second local network access point 106 or 1304 is stronger and may suggest that the messaging continue via the local network access point having the stronger signal. Functionality exists in networked devices to store details of previously accessed wireless local networks, and then automatically connect to a stored network once in range. In one embodiment, the stored details of wireless networks that have been previously accessed may be associated with user contact details and the communications application may be configured to attempt to select previously used local networks for communications between users of the first and second networked devices 102 and 104. If a particular communication were to involve transmission of significant amounts of data (for example, video content), the transmission may be delayed until the networked devices 102 and 104 were in range of a common local network access point. Scheduling of such data transfers may be based in part on the location of each of the networked devices 102 and 103 as provided by their respective location receivers 230. Transitioning over to the other network during a communication may additionally involve repeating the notification process (blocks 1014-1018) of the process 1000 in FIG. 10 to re-establish the connection between devices.

If at block 1210, it is determined that no other local networks are in range, then block 1210 directs the microprocessor 202 to block 1212, which directs the microprocessor to connect to the wide area network 110. In the communications system 1300 the first networked device 102 has the option of connecting to the wide area network 110 either via the first local network access point 106 or directly via the mobile data connection 126 and the first networked device may select between these connections for accessing the wide area network. If the second local network access point 1304 is in range the first networked device 102 may also connect to the 110 via the second local network access point. The second networked device 104 is able to connect to the wide area network 110 via the second local network access point 1304.

Block 1214 then directs the microprocessor 202 to determine whether the second networked device 104 is online via the wide area network 110. In one embodiment, the communications application may be configured to communicate with the communications server 406 to determine whether networked devices associated with contacts stored in the contacts database 244 on the first networked device 102 have indicated to the communications server that they are also accessible via the wide area network 110 (i.e. the networked device has a data connection to the WAN). In the communications system 1300, the second networked device 104 has a data connection to the 110 via the second local network access point 1304 and is therefore accessible via the wide area network and communications server 406. Block 1214 thus directs the microprocessor 202 of the first networked device 102 to block 1216, which directs the microprocessor 202 to transmit the message via the communications server 406. If at block 1214, the second networked device 104 is not accessible via the wide area network 110 the process 1200 ends at 1224.

The communications application may be configured to manage the state of the wireless communication within the application. At present, some Smartphone operating systems 240 (shown in the processor circuit of FIG. 2) limit the ability of applications running on the device to manage or change wireless data connections between different network access data points. However, these limitations are imposed by the operating system vendors, and may be removed or bypassed under certain circumstances to permit more open access from within the communications application. Other devices on which the communications application may be run do not have such limitations. In one embodiment, a networked device may be configured to act as both a mobile hotspot that permits other networked devices to connect while still permitting the device to connect to the wide area network 110. This configuration would permit the device to message other networked devices while simultaneously downloading data via the wide area network 110.

Advantageously, the process 1200 permits communications to be established between networked devices via a variety of different access points including a mobile data connection 126 to the wide area network 110, other wide area network connection, first local network access point 106 or the second local network access point 1304. The process 1200 first attempts to make the connection via the local network access point 106 (i.e. process 800), then through other local access points in common range of the first and second networked devices 102 and 104, which usually represent communication paths that provide free or low cost access to network services. Only if local access points are not available, will the message transmission occur via the wide area network 110, which typically has a higher network access cost, particularly when the mobile data connection 126 is accessed.

Additionally, while the processes herein have been described in the context of initiating a message transmission, the processes are equally applicable to in-progress message transmissions. For example, if the first networked device 102 and second networked device 104 were both initially communicating via the first local network access point 106 (FIG. 13) and the second networked device moved away from the first local network access point, the communications applications running on each of the networked devices may be configured to automatically seek a common network access point such as the second local network access point 1304 to continue communications. Similarly, if the second networked device 104 were to also move away from the second local network access point 1304, the communications applications running on each of the networked devices may be configured to automatically attempt to connect over the wide area network 110 via the communications server 406. The communications server 406 may be configured to forward text messages via the communications network 412 or may implement services such as a voice call service for maintaining a voice conversation between the users 122 and 124, even when communications via the first or second local network access points 106 and 1304 is no longer possible. Similarly, the communications applications running on each of the networked devices may be configured to automatically attempt to re-connect over local networks, should another local network access point come into common range of the first networked device 102 or second networked device 104.

Referring back to FIG. 11, the listing of message types 1100 includes details of transport protocols that may be implemented by the communications server 406 for various message types. For example, the server 406 may implement the Advanced Message Queuing Protocol (AMQP) for text messages and voice calls. Image, video, audio, and other files may be transmitted using Hypertext Transfer Protocol (HTTP), which provides for a sequence of network request-response transactions in a HTTP session and is suitable for transferring larger files.

Multicast Group Communication

Figure 14:
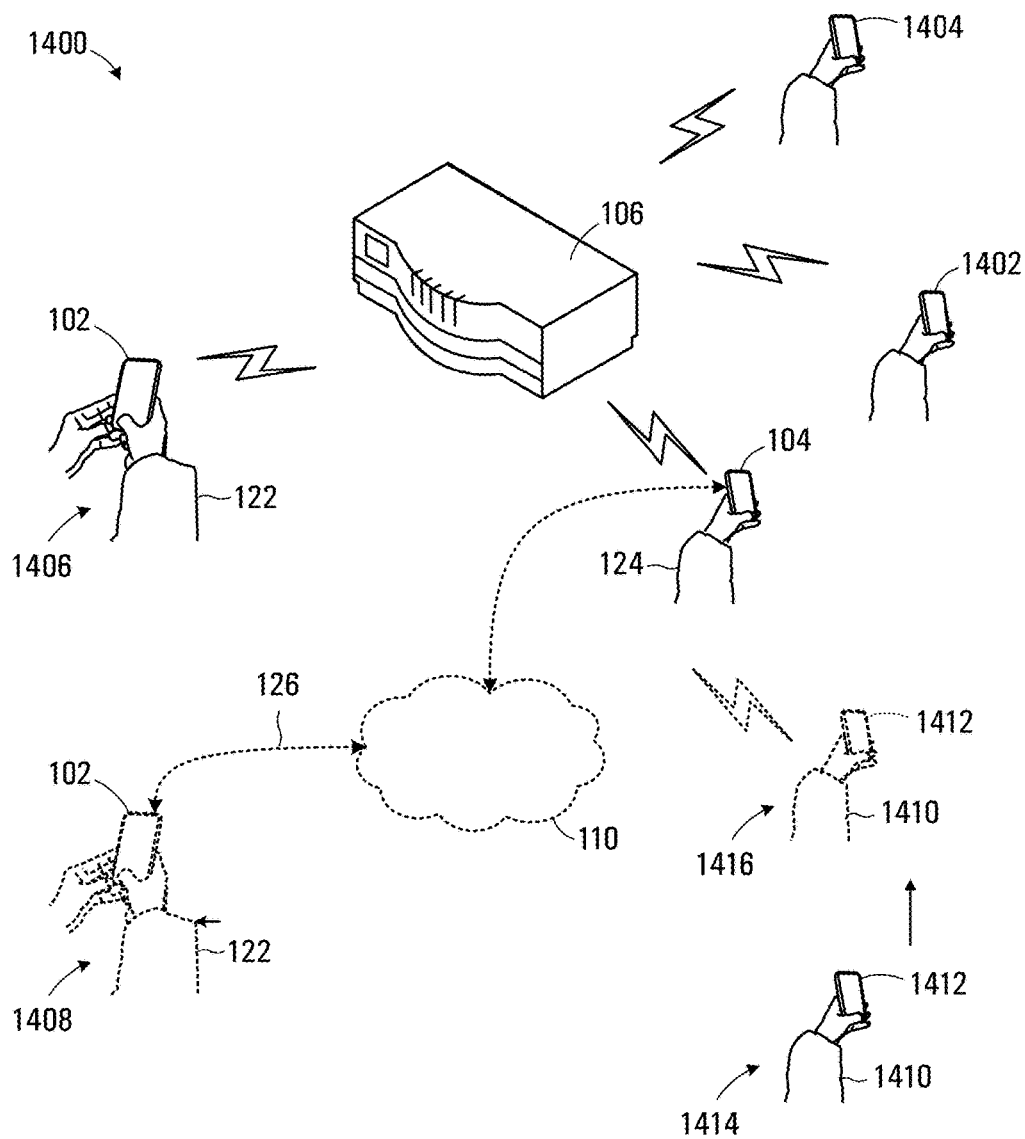
FIG. 14 is a schematic view of another communications system embodiment.

Referring to FIG. 10, in the message transmission process 1000, message transmission was between the first networked device 102 and second networked device 104 i.e. unicast transmission. Referring to FIG. 14, an alternative communications system 1400 involving the first networked device 102 and second networked device 104 and additional networked devices 1402 and 1404 is shown. Each of the networked devices 102, 104, 1402, and 1404 are in data communication with the local network access point 106. The first networked device 102 is initially located at a position 1406 that is in range of the local network access point 106.

Figure 15:
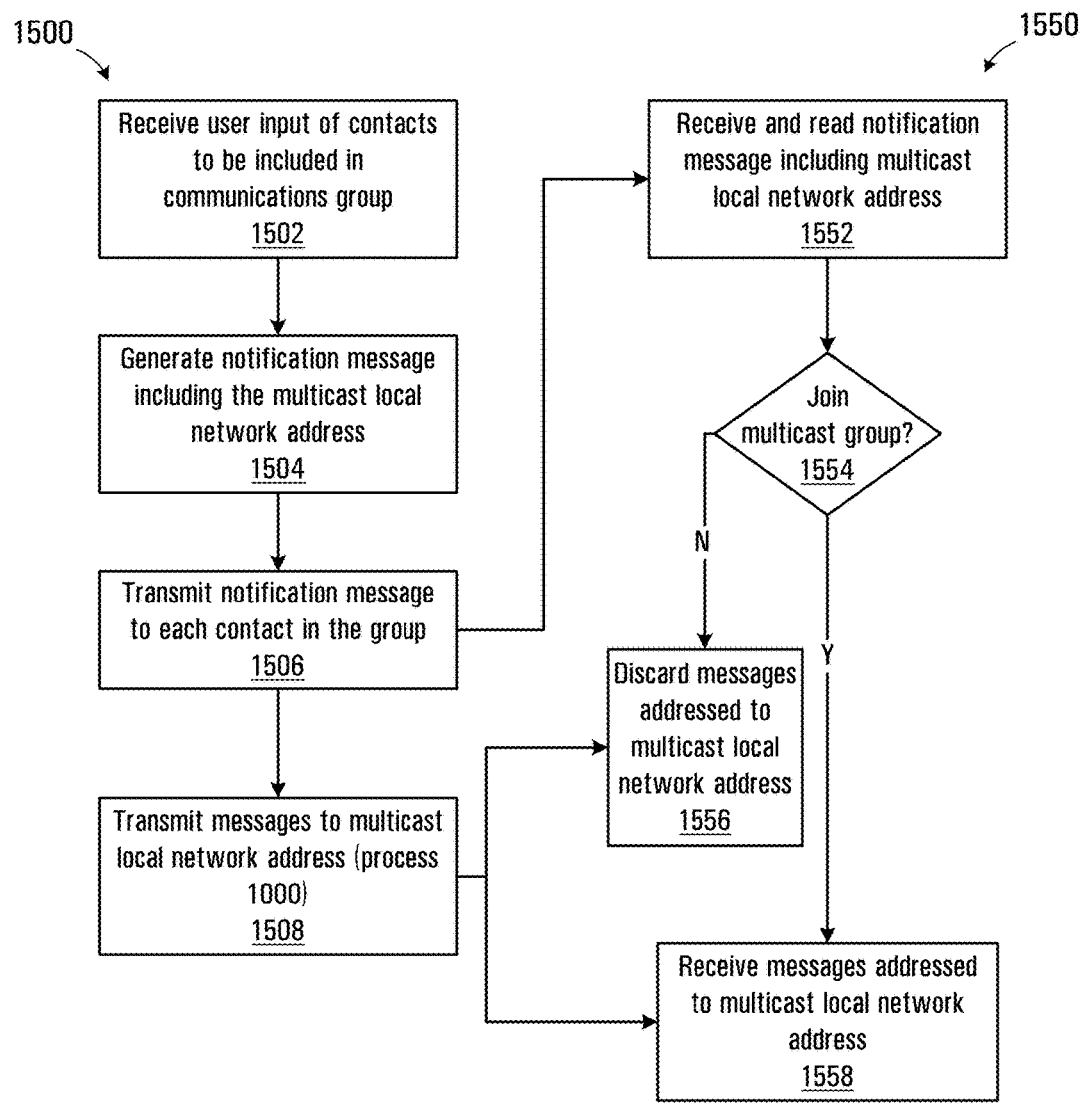
FIG. 15 is a flowchart representing blocks of codes for directing the processor circuit shown in FIG. 2 to transmit messages to a communications group via a local network.

Referring to FIG. 15, a flowchart depicting blocks of code for directing a processor circuit of the first networked device 102 to communicate between groups of networked devices in communication with one or more local network access points is shown generally at 1500. A corresponding flowchart depicting blocks of code for directing the microprocessor 202 of any of the other networked devices 104, 1402, or 1408 to join the group communication is shown at 1550 in FIG. 15.

The group communication process 1500 begins at block 1502, which directs the microprocessor 202 to receive input from the user 122 of the first networked device 102 identifying contacts in the contacts database 244 (shown in FIG. 2) for inclusion in the group. Referring to FIG. 7E, in one embodiment the user input may be provided by the user 122 selecting one or more of the contacts displayed on the screen 716.

Block 1504 of the process 1500 then directs the microprocessor 202 to generate a notification message. In one embodiment the generated notification message may be a UDP protocol message including a multicast local network address selected from a range of network addressed that are commonly reserved for multicast communications. The multicast local network address may be included in the data payload of the UDP notification message.

Block 1506 then directs the microprocessor 202 to transmit the notification message to each contact in the communications network. At this time the communications group has not yet been set up and it is necessary to inform each contact in the group of the multicast local network address so that they can elect to join the group. Accordingly, a notification message needs to be initially transmitted to each of the devices 104, 1402, and 1404 by the first networked device 102 at block 1506.

The process 1550 begins at block 1552, which directs the microprocessor 202 of the networked device to receive the notification message from the first networked device 102. The communications application running on the networked device may be configured to recognize the multicast network address in the body of the message as being associated with a multicast. Block 1554 then directs the microprocessor 202 to determine whether to join the group, based either on input from a user of the device or on a policy or preference set within the application. For example, the application may have a setting that causes the networked device to always join multicast groups, never join multicast groups, or only join multicast groups that meet a criterion. In other embodiments, the communications application may be configured to automatically include all networked devices in the group that meet a criterion. For example all devices that are in data communication with the local network access point 106, or devices within a specific geological area provided by their respective location receivers 230, or users of networked devices having certain affiliations with other users, may be automatically assigned to applicable groups for receiving multicast messages. Contacts in the contacts database 244 may include an affiliation indicator indicating entries in the contact database that have some common affiliation and may be assigned to a particular group. The individual networked devices may thus be required to opt out if the user does not wish to receive communications intended for the assigned group.

The group communication process 1500 continues at block 1508, which directs the microprocessor 202 of the first networked device 102 to transmit further messages intended for the group to the multicast local network address. The transmission generally proceeds as described for the message transmission process 1000 shown in FIG. 10, except that rather than a single local network address, the message transmission process 1000 repeats for each local network address of the networked devices. At the local network access point 106, messages having a destination address that corresponds to the multicast local network address are forwarded to each of the networked devices 104, 1402, and 1404.

If at block 1554, a particular one of the networked devices 104, 1402, or 1404 has not joined the multicast group, then the process continues at block 1556, which directs the microprocessor 202 of the particular networked device to discard messages addressed to the group local network address. If at block 1554, one of the networked devices 104, 1402, or 1404 has joined the multicast group, then the process continues at block 1558, which directs the microprocessor 202 to receive messages addressed to the multicast local network address.

For UDP messages, the group communication process 1500 thus facilitates networked devices identified as belonging to a group to communicate with less transmission overhead, since the networked device initiating the message only transmits a single message to the local network access point 106 and the local network access point forwards the UDP multicast message to the network address associated with the group, such that each of the networked devices that has joined or been joined to the group is able to receive the message. For TCP messages that require connection between networked devices the first networked device 102 would need to establish a TCP session with each of the networked devices 104, 1402, and 1404 and transmit the messages to each user.

If the group includes any networked devices that are only accessible via the wide area network 110, the first networked device 102 would additionally need to initiate another message transmission via the WAN through the communications server 406 shown in FIG. 4 for this networked device. Similarly, if the networked device that is connected via the 110 replies to the message, The first networked device 102 would receive the reply and distribute the reply to the other networked devices in the group, via the local network access point 106.

While at block 1502 the group is generated from the contacts database 244 of the first networked device 102, in other embodiments groups may be generated for all or a subset of networked devices that are in data communication with the local network access point 106. For example, the communications application running on devices 102, 104, 1402, and 1404 may recognize a particular pre-determined multicast network address as being associated with all devices in data communication with the local network access point 106. Messages transmitted by any networked device in communication with the local network access point 106 would be received by all networked devices, depending on their preferences. For example, the user 124 of the second networked device 104 may have configured the application settings to only receive multicast messages from contacts in the contacts database 244 of the second networked device.

Referring back to FIG. 14, in the embodiment shown the first networked device 102 is initially in range of the local network access point 106 and is able to communicate with the group including devices 104, 1402, and 1404. At some time the user 122 of first networked device 102 may move away from the local network access point 106 to a new location 1408. At the new location the first networked device 102 no longer has access to the local network access point 106, but does have a mobile data connection 126 to the wide area network 110.

Figure 16:
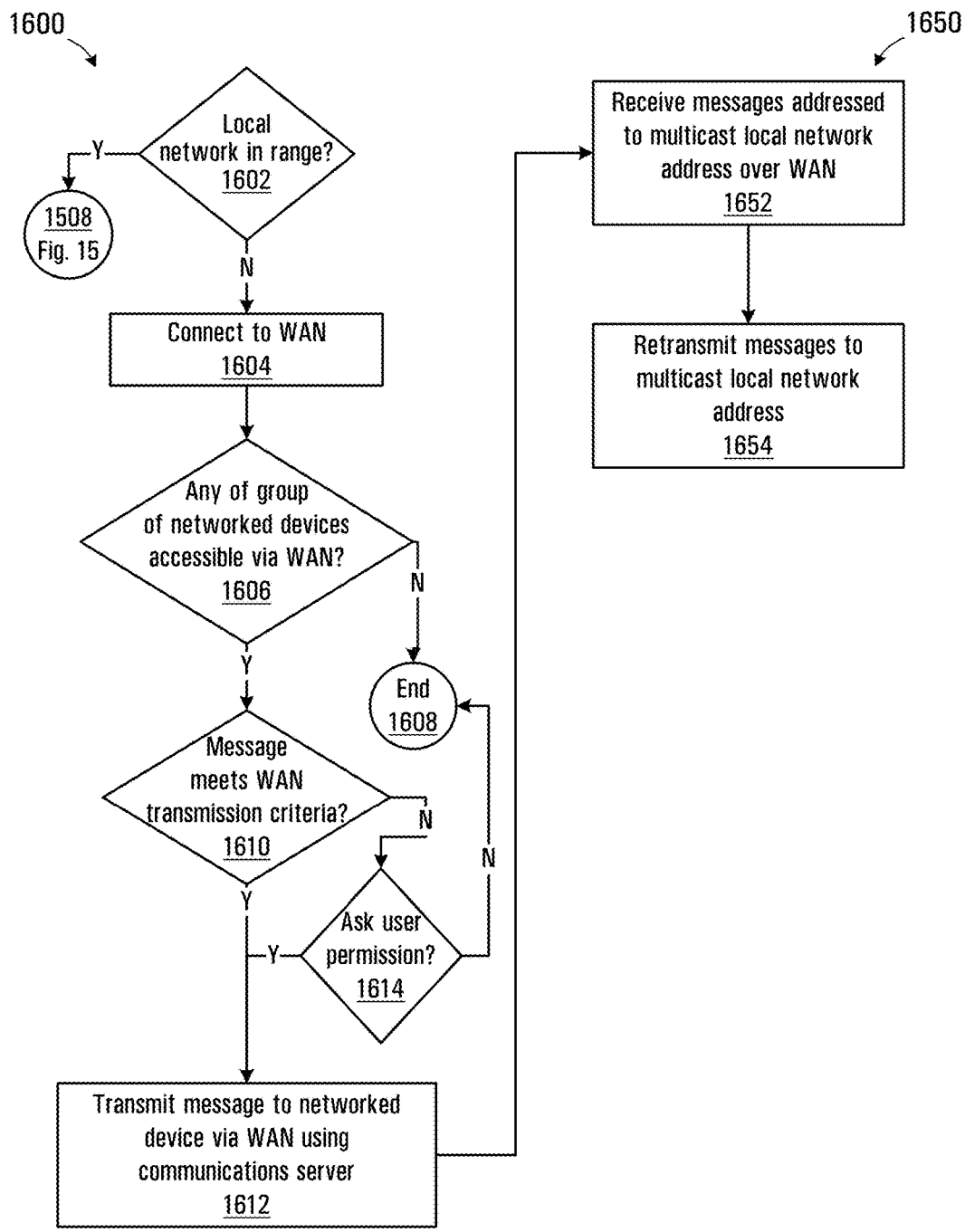
FIG. 16 is a flowchart representing blocks of codes for directing the processor circuit shown in FIG. 2 to transmit messages to a communications group via a wide area network.

Referring to FIG. 16, a flowchart depicting blocks of code for directing a processor circuit of the first networked device 102 to communicate over WAN with a group of networked devices is shown generally at 1600. A corresponding flowchart depicting blocks of code for directing the microprocessor 202 of any of the other networked devices 104, 1402, or 1408 to receive the message over the WAN is shown at 1650 in FIG. 16.

The process 1600 begins at block 1602 when the first networked device 102 transmits a message (i.e. block 1508, FIG. 15). Block 1602 directs the microprocessor 202 of the first networked device 102 to determine whether the local network access point 106 providing the local network is still within range, in which case block 1508 of the process 1500 proceeds as set forth in FIG. 15. If however at block 1602, the local network access point 106 is out of range of the first networked device 102, the microprocessor 202 is directed to block 1604. Block 1604 directs the microprocessor 202 of the 102 to connect to the wide area network 110 using the mobile data connection 126.

The process 1600 then continues at block 1606, which directs the microprocessor 202 to determine whether any of the networked devices 104, 1402, and 1404 are accessible via the wide area network 110 as described above in connection with block 1214 of the process 1200. If at block 1606, none of the networked devices 104, 1402, and 1404 are accessible via the wide area network 110, then there is no way of continuing the communication and the process ends at 1608. However, if at block 1606 at least one of the networked devices 104, 1402, and 1404 is accessible via the wide area network 110, then the microprocessor 202 is directed to block 1612. In this case the second networked device 104 has a mobile data connection to the wide area network 110. Block 1612 directs the microprocessor 202 to transmit the message intended for the group to the second networked device 104 via the wide area network 110 using the communications server 406 as described above in connection with block 1216 of the process 1200.

The process 1650 begins at block 1652, when the second networked device 104 receives the message over the wide area network 110 from the communications server 406 as described above in connection with block 1216 of the process 1200. Block 1650 then directs the microprocessor 202 of the second networked device 104 to block 1654.

Block 1654 directs the microprocessor 202 to re-transmit the message received from the first networked device 102 via the wide area network 110 to the multicast local network address. Advantageously, even though the networked devices 1402 and 1404 do not have a mobile data connection to the wide area network 110 or do not wish to use such a connection, the messages can still be received from the first networked device 102 via the second networked device 104 and the local network access point 106. Additionally, where the message includes text, video data, application data, image data, etc., the first networked device 102 of other networked device may transmit the data to other members of the group when in data communication with the local network access point 106. Alternatively, the web server 402 or other web server may act as a transmission hub for serving the message data to members of a group at a later time when the networked device of the member is connected to the web server 402 via the wide area network 110.

Referring back to FIG. 2, in the embodiment shown the non-volatile flash memory 210 of the processor circuit 200 includes a location profile store 246 for storing locations and local networks accessed by the networked device such as the first networked device 102. As an example, the user 122 of the first networked device 102 may make a similar trip every day from home, where there may be a first local network, to a coffee shop where there is free wireless access to a second local network, and then on to work where there access to a third local network is provided. The communications application stores the network name and time of access in the location profile 246 each time the first networked device 102 connects to the first, second, or third local networks. Over time, the application may be configured to construct a location profile that would facilitate generation of a prediction as to when one of the local networks is likely to be in range, and delay certain message transfers until this happens. For example, if the user 122 wishes to transmit a large video file to the user 124 of the second networked device 104 while walking to the coffee shop, the transfer could take place over the wide area network 110. However, by delaying the video file upload until the second local network at the coffee shop is in range, costs associated with the mobile data connection 126 may be avoided.

Referring back to FIG. 14, a user 1410 having a networked device 1412 may initially be out of range of the local network access point 106 at a location 1414 and may move into range at a location 1416. If the networked device 1412 is a member of the group, one of the networked devices 102, 104, 1402 or 1404 may be configured to recognize that the networked device 1412 is now in range and transmit the message to the networked device. In one embodiment, messages may be re-transmitted by one of the other networked devices if receipt of the message has not yet been acknowledged by the networked device 1412 and a predetermined period of time has not yet expired. Alternatively, in another embodiment the first networked device 102 may wish to transmit a message to only one of the networked devices, for example the networked device 1412. The first networked device 102 may encrypt and send the message to the networked devices 104, 1402 and 1404, with the expectation that these devices would pass the message along to the networked device 1412 either via the local network access point 106 or via the wide area network 110 if any of the devices 104, 1402, or 1404 have access to a mobile data connection.

Advantageously, the embodiments described herein provide for communication between networked devices via a local network access point, without requiring a mobile data connection or other connection to a wide area network. Various processes described herein thus seek to minimize costs to users for mobile data plans, while permitting access to the wide area network 110 when certain disclosed criteria are met and the intended recipient networked device is not accessible via the local network access point.

While specific embodiments have been described and illustrated, such embodiments should be considered illustrative of the invention only and not as limiting the invention as construed in accordance with the accompanying claims.

What is claimed is:

1. A method for transmitting messages between a first networked device and a second networked device via a local network provided by a local network access point, the method comprising:
   on the first networked device, determining whether the second networked device meets local communications criteria by determining whether the second networked device is accessible via the local network at a local network address by broadcasting a request message via the local network access point, the request message including network address information associated with the first networked device and being operable to illicit response messages from other networked devices in data communication with the local network access point, each response message comprising a networked device identification and a local network address for the networked device that transmitted the response message; and
   in response to a determination that the second networked device meets the local communications criteria:
      transmitting the message via the local network access point to the local network address associated with the second networked device.

2. The method of claim 1 wherein determining whether the second networked device meets local communications criteria further comprises determining whether the second networked device has registered for communications via local networks.

3. The method of claim 1 wherein the message comprises one of:
   a text message;
   a Short Message Service (SMS) message;
   a Multimedia Messaging Service (MMS) message;
   a Voice-over-Internet Protocol (VoIP) message;
   a message including audio content;
   a message including a link to audio content;
   a message including a digital image;
   a message including a link to a digital image;
   a message including video images; and
   a message including a link to video images.

4. The method of claim 1 wherein the local network access point comprises at least one of:
   a network switch;
   a network hub;
   a wireless router;
   a wired router; and
   a networked device operable to provide a tethered network connection for networking other devices.

5. The method of claim 1 wherein the networked device identification comprises at least one of:
   a telephone number associated with the networked device;
   a hardware identifier associated with the networked device;
   a user identifier associated with a user of the networked device; and
   a media access control (MAC) address of the networked device.

6. The method of claim 1 wherein broadcasting the request message comprises transmitting a User Datagram Protocol (UDP) request message to the local network access point, the UDP request message including address information operable to cause the local network access point to transmit the request message to all other networked devices in data communication with the local network access point.

7. The method of claim 1 further comprising, at the second networked device:
   receiving the request message from the first networked device; and
   transmitting a response message including the networked device identification and local network address for the second networked device.

8. The method of claim 1 wherein broadcasting the request message comprises broadcasting successive request messages.

9. The method of claim 1 further comprising generating an entry in a contact listing stored on the first networked device in response to receiving a response message, the entry including at least the networked device identification and the local network address in the response message.

10. The method of claim 9 wherein the entry in the contact listing further comprises an accessibility indicator having a value identifying the contact as meeting local communications criteria.

11. The method of claim 10 further comprising displaying on a display of the first networked device:
    the contact listing; and
    the accessibility indicator associated with each entry.

12. The method of claim 10 wherein broadcasting the request message comprises broadcasting successive request messages and further comprising:
    when a response message is not received within a timeout period from networked device having an entry stored in the contact listing on the first networked device, updating the accessibility indicator associated with the entry to have a value identifying the contact as no longer being accessible via the local network access point.

13. The method of claim 9 further comprising generating the contact listing by:
    transmitting a message to a registration server over a wide area network requesting contact details for the second networked device, the registration server being operable to provide contact details for networked devices that have registered for communications via local networks;
    in response to receiving contact details from the registration server, generating an entry in the contact listing identifying the second networked device as having registered for communications via local networks; and
    in response to receiving a message from the registration server indicating that contact details identifying the second networked device are not available, generating an entry in the contact listing identifying the second networked device as not having registered for communications via local networks.

14. The method of claim 1 wherein determining whether the second networked device has registered for communications via local networks comprises determining whether a contact listing stored on the first networked device includes an entry including an identifier indicating that the second networked device has registered for communications via local networks.

15. The method of claim 1 wherein the first networked device includes stored records including contact information for people associated with a user of the first networked device and wherein generating the contact listing comprises:
 accessing the stored records;
 for each stored record, determining whether a networked device associated with the contact has previously registered for communications via local network access point; and
 wherein generating the entry in the contact listing comprises:
  generating entries for response messages from registered networked devices; and
  discarding response messages from non-registered networked devices.

16. The method of claim 1 wherein determining whether the second networked device meets local communications criteria further comprises determining whether the second networked device is trusted for communications.

17. The method of claim 16 wherein determining whether the second networked device is trusted for communications comprises determining whether a contact listing on the first networked device includes an entry having an identification that matches the networked device identification in the response message.

18. The method of claim 17 wherein determining whether the second networked device is trusted for communications further comprises determining whether the entry in the contact listing is associated with an assigned level of trust.

19. The method of claim 18 further comprising, in response to a determination that the contact listing is not trusted for communications, identifying the second networked device as an anonymous contact and wherein determining whether the second networked device meets local communications criteria comprises:
 if the first networked device is configured to permit communication with anonymous contacts determining that the second networked device meets local communications criteria; and
 if the first networked device is not configured to permit communication with anonymous contacts determining that the second networked device does not meet local communications criteria.

20. The method of claim 1 wherein transmitting the message via the local network access point comprises transmitting messages comprising data associated with a file transfer from the first networked device to the second networked device by:
 transmitting a notification message to the second networked device, the notification message identifying a type of the message being transmitted; and
 in response to receiving an acknowledgement of the notification message initiating the transmission of one or more messages, each message including a portion of data associated with the file transfer.

21. The method of claim 20 wherein transmitting the notification message identifying the type of the message being transmitted comprises transmitting a message including an identification of a communication protocol for transmitting the message.

22. The method of claim 21 wherein the local network access point comprises one of a plurality of local network access points accessible to the first networked device for data communications and wherein transmitting the notification message comprises transmitting a notification message including information identifying one of the plurality of local network access points and further comprising delaying initiating the transmission of the one or more messages until an acknowledgement is received from the second networked device indicating that the identified one of the plurality of local network access points is accessible to the second networked device.

23. The method of claim 22 further comprising storing details of local network access points accessible to the first networked device and further comprising identifying one of the plurality of local network access points based on stored details.

24. The method of claim 23 wherein the first and second networked devices each include a location receiver operable to provide a location of the networked device and wherein identifying one of the plurality of local network access points is based on a location of each of the networked devices.

25. The method of claim 1 wherein at least one of the first networked device and local network access point are connected to a wide area network, and further comprising, in response to a determination that the second networked device does not meet the local communications criteria, transmitting the message to the second networked device via the wide area network.

26. The method of claim 25 wherein transmitting the message to the second networked device via the wide area network comprises transmitting the message to a communications server accessible via the wide area network, the communications server having address information associated with networked devices that have registered for communications via the communications server, the communications server being operable to forward the message to the second networked device.

27. The method of claim 25 wherein the wide area network comprises at least one of:
 a data network provided by an internet services provider;
 a data network provided by a mobile telecommunications network provider; and
 a local area network.

28. The method of claim 1 wherein the local network access point is implemented as a mobile hotspot on the first networked device.

29. The method of claim 28 wherein the first networked device is operably configured for data communication via a wide area network while simultaneously communicating with other networked devices via the mobile hotspot.

30. The method of claim 1 wherein the local network access point comprises one of a plurality of local network access points accessible to the first networked device for data communications and wherein determining whether the second networked device meets the local communications criteria comprises:
 determining whether the second networked device meets the local communications criteria for communication via each local network access point in the plurality of network access points; and
 wherein transmitting the message comprises transmitting the message via the one of the local network access points for which the second networked device meets the local communications criteria.

31. The method of claim 30 wherein transmitting the message comprises transmitting a message including connection information for facilitating connection of the second networked device to:
 one of the local network access points accessible to the first networked device for data communications; and
 a local network access point selected by a user of the first networked device.

32. The method of claim 1 wherein transmitting the message via the local network access point comprises transmitting a notification message to the second networked device and other networked devices belonging to a group, the notification message including a multicast network address on the local network access point for facilitating multicast communications from the first networked device to the second networked device and the other networked devices belonging to the group.

33. The method of claim 32 wherein at least one networked device of the group of networked devices is not in communication with the local access point and further comprising transmitting the message via a wide area network to the at least one networked device not in communication with the local access point.

34. The method of claim 33 further comprising, receiving a reply message from the at least one networked device not in communication with the local access point via the wide area network and further comprising relaying the reply message to the multicast network address for receipt by other networked devices in communication with the local access point.

35. The method of claim 32 wherein transmitting the message to networked devices belonging to the group comprises transmitting multicast messages to a group comprising all of the networked devices in communication with the local access point.

36. The method of claim 32 further comprising, when the local access point is no longer accessible by the first networked device:
   connecting to a wide area network; and
   in response to determining that one of the networked devices in the group is in communication with a wide area network and the local access point, transmitting the message to the networked device in the group that is in communication with a wide area network for retransmission to the group of networked devices via the local access point.

37. The method of claim 1 wherein transmitting the message comprises transmitting a message including advertising content or a link to advertising content for display on the second networked device.

38. The method of claim 1 further comprising downloading a communications application program for implementing local communications on the networked device, wherein downloading comprises receiving a data transfer from another networked device.

39. A non-transitory computer readable medium encoded with codes for directing a processor circuit to carry out the method of claim 1.

40. A networked device for transmitting messages to a second networked device via a local network provided by a local network access point, the networked device comprising a processor circuit operably configured to:
   determine whether the second networked device meets local communications criteria by determining whether the second networked device is accessible via the local network at a local network address by broadcasting a request message via the local network access point, the request message including network address information associated with the first networked device and being operable to illicit response messages from other networked devices in data communication with the local network access point, each response message comprising a networked device identification and a local network address for the networked device that transmitted the response message; and
   in response to a determination that the second networked device meets the local communications criteria:
   transmit the message via the local network access point to the local network address associated with the second networked device.

* * * * *